(12) United States Patent
Karakkad Kesavan Namboodiri et al.

(10) Patent No.: US 11,791,885 B2
(45) Date of Patent: Oct. 17, 2023

(54) MANAGING BEAM SELECTION FOR A MULTI-SUBSCRIPTION WIRELESS DEVICE

(71) Applicant: QUALCOMM Incorporated, San Diego, CA (US)

(72) Inventors: Vishnu Namboodiri Karakkad Kesavan Namboodiri, Hyderabad (IN); Shashidhar Vummintala, Bangalore (IN); Suresh Sanka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/452,518

(22) Filed: Oct. 27, 2021

(65) Prior Publication Data
US 2023/0131254 A1 Apr. 27, 2023

(51) Int. Cl.
| | |
|---|---|
| H04B 7/06 | (2006.01) |
| H04W 24/08 | (2009.01) |
| H04W 72/044 | (2023.01) |
| H04W 88/06 | (2009.01) |

(52) U.S. Cl.
CPC .......... *H04B 7/0695* (2013.01); *H04W 24/08* (2013.01); *H04W 72/046* (2013.01); *H04W 88/06* (2013.01)

(58) Field of Classification Search
CPC .... H04B 7/0695; H04B 7/0805; H04B 7/088; H04W 72/046; H04W 48/16; H04W 76/28
See application file for complete search history.

(56) References Cited

U.S. PATENT DOCUMENTS

| | | |
|---|---|---|
| 2015/0257041 A1 | 9/2015 | Su |
| 2015/0257201 A1 | 9/2015 | Su |
| 2015/0289314 A1 | 10/2015 | Yang et al. |
| 2016/0330653 A1 | 11/2016 | Yang et al. |
| 2020/0169858 A1 | 5/2020 | Hu et al. |
| 2021/0195436 A1 | 6/2021 | Hong et al. |
| 2021/0250077 A1 | 8/2021 | Karakkad Kesavan Namboodiri et al. |

FOREIGN PATENT DOCUMENTS

WO    2021162922 A1    8/2021

OTHER PUBLICATIONS

Partial International Search Report—PCT/US2022/041036—ISA/EPO—dated Dec. 5, 2022.
International Search Report and Written Opinion—PCT/US2022/041036—ISA/EPO—dated Jan. 26, 2023 22 pages.

*Primary Examiner* — Gary Mui
(74) *Attorney, Agent, or Firm* — The Marbury Law Group/QUALCOMM

(57) ABSTRACT

Embodiments include systems and methods that may be performed by a processor of a multi-subscription wireless device for managing beam selection. Various embodiments may include determining a rotation angle between an orientation of a first beam of a first subscription and an orientation of a second beam of the first subscription, applying the rotation angle to a first beam of a second subscription to identify a second beam of the second subscription, and performing a tune-away operation comprising tuning a radio frequency (RF) resource of the multi-subscription wireless device to the second subscription and configuring spatial filter parameters of an antenna array to communicate via the identified second beam of the second subscription.

30 Claims, 15 Drawing Sheets

MANAGING BEAM SELECTION FOR A MULTI-SUBSCRIPTION WIRELESS DEVICE

BACKGROUND

Wireless devices perform beam switching operations to change preferential receiving directions (spatial filtering) when the direction to a serving cell changes, such as when the wireless device rotates or moves from place to place. In such operations, a wireless device receiving signal from a current (first) beam reconfigures antenna arrays to preferentially receive signals along a second beam. The wireless device can detect an appropriate beam to monitor in response to rotations (e.g., when the user turns his/her head) by performing beam sweeping operations in which the wireless device configures an antenna array to "point" the antenna in different directions and measures received signal quality (e.g., radio frequency (RF) strength, signal quality, etc.) in each pointing direction. The wireless device determines the appropriate beam transmitted by the base station that the wireless device should monitor, based on signaling received from the base station.

The beam switch process for multi-SIM wireless devices require beam sweeping measurement operations to find an appropriate second beam for each of at least a first subscription (SUB1) and a second subscription (SUB2). SUB1 and SUB2 may be communicated on different beams. In that case, to identify the second beam to receive signals for SUB2, the wireless device must perform a tune-away from the frequency of SUB1 to the frequency of SUB2 and then perform beam sweeping measurements for SUB2. A tune-away requires warm up time to settle the receiver on the SUB2 frequency plus the time required to perform the beam sweeping operations. Thus, performing beam sweeping measurements on SUB2 extends the time that the wireless device cannot monitor SUB1, which can reduce the throughput on SUB1. On the other hand, if the wireless device does not perform a long tune-away to SUB2 to perform the beam sweeping operations, the pointing direction of the antenna for SUB2 may not be correct, in which case paging messages in SUB2 may be missed. Thus, reception performance for both SUB1 or SUB2 is affected by the processes by which a receiving device maintains beam monitoring (i.e., antenna pointing directions plus transmit beam monitored).

SUMMARY

Various aspects include systems and methods performed by a multi-subscription wireless device for managing beam selection. Some aspects may include determining a rotation angle between an orientation of a first beam of a first subscription and an orientation of a second beam of the first subscription, applying the rotation angle to a first beam of a second subscription to identify a second beam of the second subscription, and performing a tune-away operation including tuning a radio frequency (RF) resource of the multi-subscription wireless device to the second subscription and configuring spatial filter parameters of an antenna array to communicate via the identified second beam of the second subscription.

In some aspects, determining the rotation angle between the orientation of the first beam of the first subscription and the orientation of the second beam of the first subscription may include determining the rotation angle between the orientation of the first beam of the first subscription and the orientation of the second beam of the first subscription in response to the first subscription changing from the first beam to the second beam. Some aspects may include determining whether a serving cell or serving synchronization signal block (SSB) has changed for the first subscription. In such aspects, determining the rotation angle between the orientation of the first beam of the first subscription and the orientation of the second beam of the first subscription may include determining the rotation angle between the orientation of the first beam of the first subscription and the orientation of the second beam of the first subscription in response to determining that the serving cell or serving SSB has not changed for the first subscription.

Some aspects may include, in response to determining that the serving cell or serving SSB has changed for the first subscription, determining an angular difference between a previous serving cell for the first subscription and a currently serving cell for the first subscription, or between a previous SSB for the first subscription and a current SSB for the first subscription, and adjusting the rotation angle between the orientation of the first beam of the first subscription and the orientation of the second beam using the determined angular difference between the cells or SSBs. In some aspects, applying the rotation angle to the first beam of the second subscription to identify the second beam of the second subscription may include applying the rotation angle to a codebook including correlations between spatial coordinates of beams of the first subscription to orientations for beams of the second subscription, and identifying the second beam of the second subscription based in part on a correlation obtained of the determined difference in rotation angle and the second beam of the second subscription.

Some aspects may include performing beam refinement operations for the second beam of the second subscription during the tune-away operation. In some aspects, performing the tune-away operation including tuning a radio frequency (RF) resource of the multi-subscription wireless device to the second subscription and configuring spatial filter parameters of the antenna array to communicate via the identified second beam of the second subscription may include determining whether the second beam of the second subscription is expected to experience interference meeting a threshold interference, and configuring spatial filter parameters of the antenna array to communicate via the identified second beam of the second subscription in response to determining that the second beam of the second subscription is not expected to experience interference meeting a threshold interference.

Some aspects may include performing measurements of neighbor beams of the second beam of the second subscription in response to determining that the second beam of the second subscription is expected to experience interference meeting a threshold interference, and configuring spatial filter parameters of the antenna array to receive a neighbor beam from among the neighbor beams of the second beam of the second subscription having a relatively highest signal strength. Some aspects may include initializing a beam sweep timer after beginning the tune-away operation, determining whether the beam sweep timer has elapsed, performing measurements of neighbor beams of the second beam of the second subscription in response to determining that the beam sweep timer has elapsed, and configuring spatial filter parameters of the antenna array to receive a neighbor beam from among the neighbor beams of the second beam of the second subscription having a relatively highest signal strength.

Some aspects may include determining whether a page decode failure has occurred on the second beam of the second subscription, performing measurements of neighbor beams of the second beam of the second subscription in response to determining that the page decode failure has occurred on the second beam of the second subscription, and configuring spatial filter parameters of the antenna array to receive a neighbor beam from among the neighbor beams of the second beam of the second subscription having a relatively highest signal strength. Some aspects may include determining whether a signal strength of the second beam of the second subscription meets a threshold signal strength, configuring the spatial filter parameters of the antenna array to communicate via the identified second beam of the second subscription in response to determining that the signal strength of the second beam of the second subscription meets the threshold signal strength, and configuring the spatial filter parameters of the antenna array to receive a parent beam of the second beam of the second subscription in response to determining that the signal strength of the second beam of the second subscription does not meet the threshold signal strength.

Further aspects may include a multi-subscription wireless device having a processor configured to perform one or more operations of any of the methods summarized above. Further aspects may include a non-transitory processor-readable storage medium having stored thereon processor-executable instructions configured to cause a processor of a multi-subscription wireless device to perform operations of any of the methods summarized above. Further aspects include a multi-subscription wireless device having means for performing functions of any of the methods summarized above. Further aspects include a system on chip for use in a multi-subscription wireless device that includes a processor configured to perform one or more operations of any of the methods summarized above.

Various aspects include systems and methods performed by a multi-subscription wireless device for managing beam selection. Some aspects may include receiving simultaneous Transmission Configuration Information (TCI) information that includes a Quasi-Co-Location (QCL) relationship of a first Synchronization Signal Block (SSB) of a first subscription and a second SSB of the first subscription, applying the QCL relationship to a first SSB of a second subscription to determine a second SSB of the second subscription, and performing a tune-away operation including tuning a radio frequency (RF) resource of the multi-subscription wireless device to the second subscription and configuring spatial filter parameters of an antenna array to receive the second SSB of the second subscription.

Some aspects may include determining whether the second SSB of the first subscription is activated by a TCI state for the second subscription, configuring spatial filter parameters of the antenna array to receive the second SSB of the first subscription for use by the second subscription during the tune-away operation in response to determining that the second SSB of the first subscription is activated by a TCI state for the second subscription, and applying the QCL relationship to the first SSB of the second subscription to determine the second SSB of the second subscription may include applying the QCL relationship to the first SSB of the second subscription to determine the second SSB of the second subscription in response to determining that the second SSB of the first subscription is not activated by a TCI state for the second subscription. In some aspects, operations of receiving the simultaneous TCI information that includes a QCL relationship of a first SSB of the first subscription and a second SSB of the first subscription, and applying the QCL relationship to a first SSB of the second subscription to determine a second SSB of the second subscription may be performed prior to the tune-away operation.

In some aspects, receiving simultaneous TCI information that includes a QCL relationship of a first SSB of a first subscription and a second SSB of the first subscription may include receiving simultaneous TCI information for a plurality of component carriers that includes a QCL relationship of a first SSB index of a first subscription and a second SSB index of the first subscription. In such aspects, applying the QCL relationship to a first SSB of a second subscription to determine a second SSB of the second subscription may include applying the QCL relationship to the first SSB of a second subscription to determine the second SSB of the second subscription in response to determining that a current serving component carrier of the second subscription is among the received TCI information for the plurality of component carriers.

Further aspects may include a multi-subscription wireless device having a processor configured to perform one or more operations of any of the methods summarized above. Further aspects may include a non-transitory processor-readable storage medium having stored thereon processor-executable instructions configured to cause a processor of a multi-subscription wireless device to perform operations of any of the methods summarized above. Further aspects include a multi-subscription wireless device having means for performing functions of any of the methods summarized above. Further aspects include a system on chip for use in a multi-subscription wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
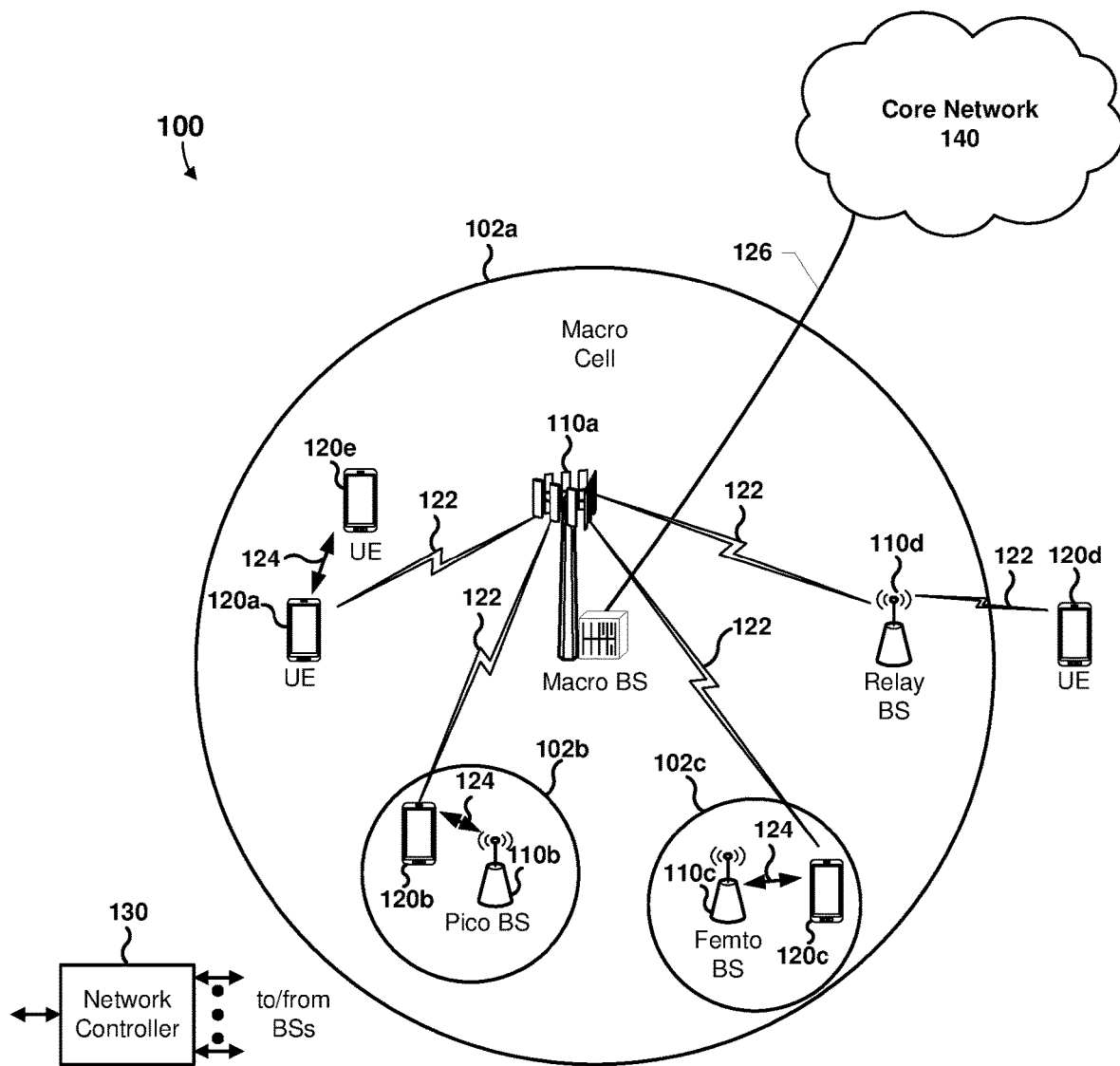
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for wireless devices managing a communication link with a communication network in which wireless devices receive serving cells using special filtering implemented on antenna arrays to form reception beams. Various embodiments may improve the efficiency and accuracy of wireless communications between a wireless device and a communication network by improving the capability of a wireless device to perform tune-aways to a second subscription using beam forming receive antennas based on changes in reception beams of a first subscription.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within vehicles, wireless devices affixed to or incorporated into various mobile platforms, global positioning system devices, and similar electronic devices that include a memory, wireless communication components and a programmable processor.

As used herein, the term "beam" refers to a signal formed by a transmitting device through the use of a beamforming or beam steering technique applied via a combination of physical equipment and signal processing variously referred to as a beamforming function. Beam reception by a receiving wireless device may involve configuring physical equipment and signal processing of the receiving device to preferentially receive signals along a direction of a beam by the transmitting device. Beam reception by a receiving device may involve configuring physical equipment and signal processing of the receiving device via a mapping function or a spatial filter so as to preferentially receive signals (e.g., with enhanced gain) from a particular direction (e.g., in a direction aligned with a transmitting device).

The term "beamforming" is used herein to refer to antenna array design and signal processing techniques used for directional signal communications and/or to achieve spatial selectivity (i.e., spatial filtering) of radio frequency (RF) signal reception. Beamforming on the transmitter end of communications may be accomplished by selective delaying (known as "phase shifting") of signals coupled to different elements in an antenna array so that RF signals emitted by the antenna array at a particular angle (relative to the antenna array) are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two axes (i e, azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment. Configuring an antenna array to send and/or receive a beamformed signal may be referred to as "configuring spatial filter parameters of an antenna array."

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Wireless devices are being developed that support multiple 5G New Radio (NR) subscriptions. For example, a wireless device may include two Subscriber Identity Module (SIM) cards, associated with a first subscription (SUB1) and a second subscription (SUB2). When the wireless device only includes one radio and associated circuitry (i.e., a single transmit/receive (TX/RX) chain), SUB1 and SUB2 share access to the TX/RX chain. For example, SUB1 may operate in a connected mode, in which SUB1 has access to the TX/RX chain, and SUB2 may operate in an idle mode, in which SUB2 does not have access to the TX/RX chain. From time to time, to perform operations using SUB2 (e.g., page decoding, beam sweeping, signal measurements, etc.) the wireless device performs a "tune-away" operation which grants SUB2 access to the TX/RX chain for a period of time referred to as a "tune-away gap."

Some 5G communication signals use millimeter wave (mmWave) frequencies, and use beams that are formed at a transmitting device through the use of a beamforming or beam steering technique. Receiving wireless devices receive a beam by configuring physical equipment and signal processing to preferentially receive RF signals from one direction compared to other directions. Beams are highly directional, and very sensitive to wireless device mobility, including wireless device rotation. Thus, a receiving wireless device receiving signals from a base station that is transmitting signals along a beam configures antenna equipment and signal processing to preferentially receive (sometimes referred to as a spatial filter) a given beam transmitted by a base station.

Reception of 5G signals using beamforming techniques may require frequent beam switching operations to receive and transmit signals via a beam to or from a base station based as the angle of the wireless device with respect to the direction to the base station changes as the wireless device rotates and wireless moves with respect to the location of the base station. For example, when a wireless device user is relatively stationary and holding the receiving device, the beam transmitted by the base station that the device monitors may not change, but the angle of the wireless device with respect to the direction to the base station may change as the user's head turns or the user walks in different directions. As another example, in a moving automobile, the beam that the receiving device monitors will change with time as the device moves from location to location, and thus the receiving device will need to change which beam transmitted by the base station that the receiving device is monitoring.

Wireless devices perform beam switching operations to change preferential receiving directions (spatial filtering) when the device rotates, and from a current (first) beam to a second beam when the wireless device moves from place to place. The wireless device can detect an appropriate beam to monitor in response to rotations (e.g., when the user turns his/her head) by performing beam sweeping operations in which the device "points" the antenna in different directions and measures received signal quality (e.g., RF strength, signal quality, etc.). The wireless device determines the appropriate beam transmitted by the base station that the wireless device should monitor, based on signaling received from the base station.

Conventionally, the beam switch process for multi-SIM wireless devices requires beam sweeping measurement operations to find an appropriate second beam for each of the two subscriptions (i.e., SUB1 and SUB2). SUB1 and SUB2 may be communicated on different beams. In that case, to identify the second beam for SUB2, the wireless device must perform a tune-away from SUB1 to SUB2 and then perform beam sweeping measurements for SUB2. A tune-away requires a warm up time to settle the receiver on the SUB2 frequency plus the time required to perform the beam sweeping operations. This extends the time that the receiving device cannot monitor SUB1, which can reduce the throughput on SUB1. On the other hand, if the wireless device does not perform a long tune-away to SUB2 to perform the beam sweeping operations, the pointing direction of the antenna for SUB2 may not be correct, in which case paging messages in SUB2 may be missed. Thus, reception performance for both SUB1 or SUB2 is affected by the processes by which a receiving device maintains beam monitoring (antenna pointing directions plus transmit beam monitored).

Various embodiments include methods and multi-subscription wireless device configured to perform methods for beam selection that use information determined by the wireless device in the beam or pointing direction for the first subscription to quickly infer a candidate beam in a second subscription to use for monitoring during a tune-away operation. In this manner, the multi-subscription wireless device may avoid, or substantially reduce, performing beam sweeping in the second subscription during the tune-away gap. In this manner, the multi-subscription wireless device may reduce a tune-away gap even when the wireless device has rotated since performing previous tune-away operations.

In various embodiments, a multi-subscription wireless device may determine a rotation angle between an orientation of a first beam of a first subscription and an orientation of a second beam of the first subscription, apply the rotation angle to a first beam of a second subscription to identify a second beam of the second subscription, and perform a tune-away operation that includes tuning a radio frequency (RF) resource of the multi-subscription wireless device to the second subscription and configuring spatial filter parameters of an antenna array to communicate via the identified second beam of the second subscription. In some embodiments, the multi-subscription wireless device may determine the rotation angle between the orientation of the first beam of the first subscription and the orientation of the second beam of the first subscription in response to changing from the first beam to the second beam in the first subscription. In some embodiments, the multi-subscription wireless device may determine the rotation angle just prior to performing a tune-away. In some embodiments, the multi-description wireless device may determine the rotation angle when a tune-away operation is triggered. In some embodiments, the multi-subscription wireless device may determine the rotation angle periodically or from time to time. In some embodiments, the multi-subscription wireless device may determine the rotation angle each time the first subscription changes from a first beam to a second beam.

In some embodiments, the multi-subscription wireless device may determine whether the wireless device has moved (e.g., due to wireless device mobility) so that a Synchronization Signal Block (SSB) or cell with which the multi-subscription wireless device communicates with a base station for the first subscription has changed. In some embodiments, in response to determining that the serving cell or serving SSB has not changed for the first subscription, the multi-subscription wireless device may determine the rotation angle between the orientation of the first beam of the first subscription and the orientation of the second beam. In some embodiments, in response to determining that the serving cell or serving SSB has changed for the first subscription, the multi-subscription wireless device may perform additional operations to account for the change in serving cell or serving SSB. In some embodiments, the multi-subscription wireless device may determine an angular difference between the previous cell and the currently serving cell, or between a previous SSB on the first subscription and the currently serving SSB on the first subscription. The multi-subscription wireless device may adjust the rotation angle between the orientation of the first beam of the first subscription and the orientation of the second beam using the determined angular difference between the cells or SSBs.

In some embodiments, the multi-subscription wireless device may apply the rotation angle to a codebook that includes correlations between spatial coordinates of beams of the first subscription to orientations for beams of the second subscription. The multi-subscription wireless device may use the correlation obtained of the determined difference in rotational information and the second beam of the second subscription to identify the second beam of the second subscription. For example, a multi-subscription wireless device may be configured with a codebook or codebook manager (or another suitable data structure). In some embodiments, the codebook manager may include information such as a frequency band, a beam identifier, a phasor (or another suitable angle notation), a transmit device identifier, a receive device identifier, an antenna group value, a codebook table identifier, a sub-array group value, a number of active elements, an antenna type value, an amplitude value, a phase value, a beam type value, an array gain value, a beam level, parent beam information, neighbor beam information, children beam information, an azimuth value, an elevation value, beam spatial location information such as coordinates, and other suitable information. In some embodiments, the multi-subscription wireless device may determine a beam that corresponds to spatial location information (for example, theta and phi coordinates). In some embodiments, the multi-subscription wireless device may use the codebook to identify the second beam of the second subscription based in part on the correlation obtained of the determined difference in rotation angle and the second beam of the second subscription.

In some embodiments, the multi-subscription wireless device may perform beam refinement operations for the second beam of the second subscription during the tune-away operation. For example, the multi-subscription wireless device may perform operations to refine tuning and synchronization for signals received for the second subscription, such as minor frequency refinements, a tracking loop, and/or the like.

In some embodiments, the multi-subscription wireless device may perform operations to improve or adjust signal reception for the second subscription. In some embodiments, the multi-subscription wireless device may determine whether the second beam of the second subscription is expected to experience interference meeting a threshold interference. In some embodiments, the multi-subscription wireless device may determine whether the second beam of the second subscription is included in a disallowed beam list. In response to determining that the second subscription is not expected to experience interference meeting a threshold interference (e.g., the second beam of the second subscription is not included in the disallowed beam list), the multi-subscription wireless device may configure spatial filter parameters of its antenna array to communicate via the identified second beam of the second subscription. In some embodiments, in response to determining that the second subscription is expected to experience interference meeting a threshold interference, the multi-subscription wireless device may perform measurements of neighbor beams of the second beam of the second subscription, and may configure spatial filter parameters of the antenna array to receive a neighbor beam from among the neighbor beams of the second beam of the second subscription having a relatively highest signal strength.

In some embodiments, the multi-subscription wireless device may initialize a beam sweep timer after beginning the tune-away operation. In response to determining that the beam sweep timer has elapsed, the multi-subscription wireless device may perform measurements of neighbor beams of the second beam of the second subscription, and may configure spatial filter parameters of the antenna array to receive a neighbor beam from among the neighbor beams of the second beam of the second subscription having a relatively highest signal strength.

In some embodiments, the multi-subscription wireless device may determine whether a page decode failure has occurred on the second beam of the second subscription. In response to determining that a page decode failure has occurred on the second beam of the second subscription, the multi-subscription wireless device may perform measurements of neighbor beams of the second beam of the second subscription, and may configure spatial filter parameters of the antenna array to receive a neighbor beam from among the neighbor beams of the second beam of the second subscription having a relatively highest signal strength.

In some embodiments, the multi-subscription wireless device may perform operations to improve the determination an SSB of the second subscription. SSB identification and signal reception is an important aspect of beam management, as SSBs include primary and secondary synchronization signals (PSS and SSS) and the physical broadcast channel (PBCH). In some embodiments, the multi-subscription wireless device may receive simultaneous Transmission Configuration Information (TCI) information that includes a Quasi-Co-Location (QCL) relationship of an SSB of the first subscription and a second SSB of the first subscription. In some embodiments, the multi-subscription wireless device may receive TCI information from a base station. In some embodiments, the base station may transmit TCI information in configuration signaling, for example in a message such as simultaneousTCI-UpdateList, simultaneousTCI-UpdateListSecond, simultaneousTCI-UpdateList-r16, simultaneousTCI-UpdateListSecond-r16, and/or another suitable message or signaling. In such embodiments, the multi-subscription wireless device may apply the QCL relationship to a first SSB of the second subscription to determine a second SSB of the second subscription. The multi-subscription wireless device may then configure spatial filter parameters of its antenna array to receive the second SSB of the second subscription.

In some embodiments, the multi-subscription wireless device may determine whether an SSB of the first subscription is available for use by the second subscription. In some embodiments, the multi-subscription wireless device may determine whether the second SSB of the first subscription is activated by a TCI state for the second subscription. In response to determining that the second SSB of the first subscription is activated by a TCI state for the second subscription, the multi-subscription wireless device may configure spatial filter parameters of its antenna array to receive the second SSB of the first subscription for use by the second subscription during the tune-away operation. In response to determining that the second SSB of the first subscription is not activated by a TCI state for the second subscription, the multi-subscription wireless device may apply the QCL relationship to the first SSB of the second subscription to determine the second SSB of the second subscription comprises applying the QCL relationship to the first SSB of the second subscription to determine the second SSB of the second subscription.

In some embodiments, the multi-subscription wireless device may perform one or more of the above-described operations prior to performing a tune-away operation, and in this manner reduce memory sharing between the first subscription and the second subscription, as well as reducing processor load and overhead. For example, in some embodiments, prior to a tune-away operation (e.g., before a tune-away operation is triggered, or before performing a triggered tune-away operation) the multi-subscription wireless device may receive the simultaneous TCI information that includes a QCL relationship of a first SSB of the first subscription and a second SSB of the first subscription, and may apply the QCL relationship to a first SSB of the second subscription to determine a second SSB of the second subscription.

In some embodiments, the multi-subscription wireless device may receive simultaneous TCI information for a plurality of component carriers that includes a QCL relationship of a first SSB index (e.g., a first serving SSB index) of the first subscription and a second SSB index of the first subscription. In such embodiments, the multi-subscription wireless device may apply the QCL relationship to the first SSB of a second subscription to determine the second SSB of the second subscription in response to determining that a current serving component carrier of the second subscription is among the plurality of component carriers.

Various embodiments may improve the operation of a multi-subscription wireless device by reducing measurement operations and search operations by the multi-sufficient wireless device on the second subscription. The various embodiments may improve the operation of a multi-subscription wireless device by improving signal reception and throughput on the first subscription and the second subscription by improving the efficiency of tune-away operations.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an evolved packet core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

Figure 2:
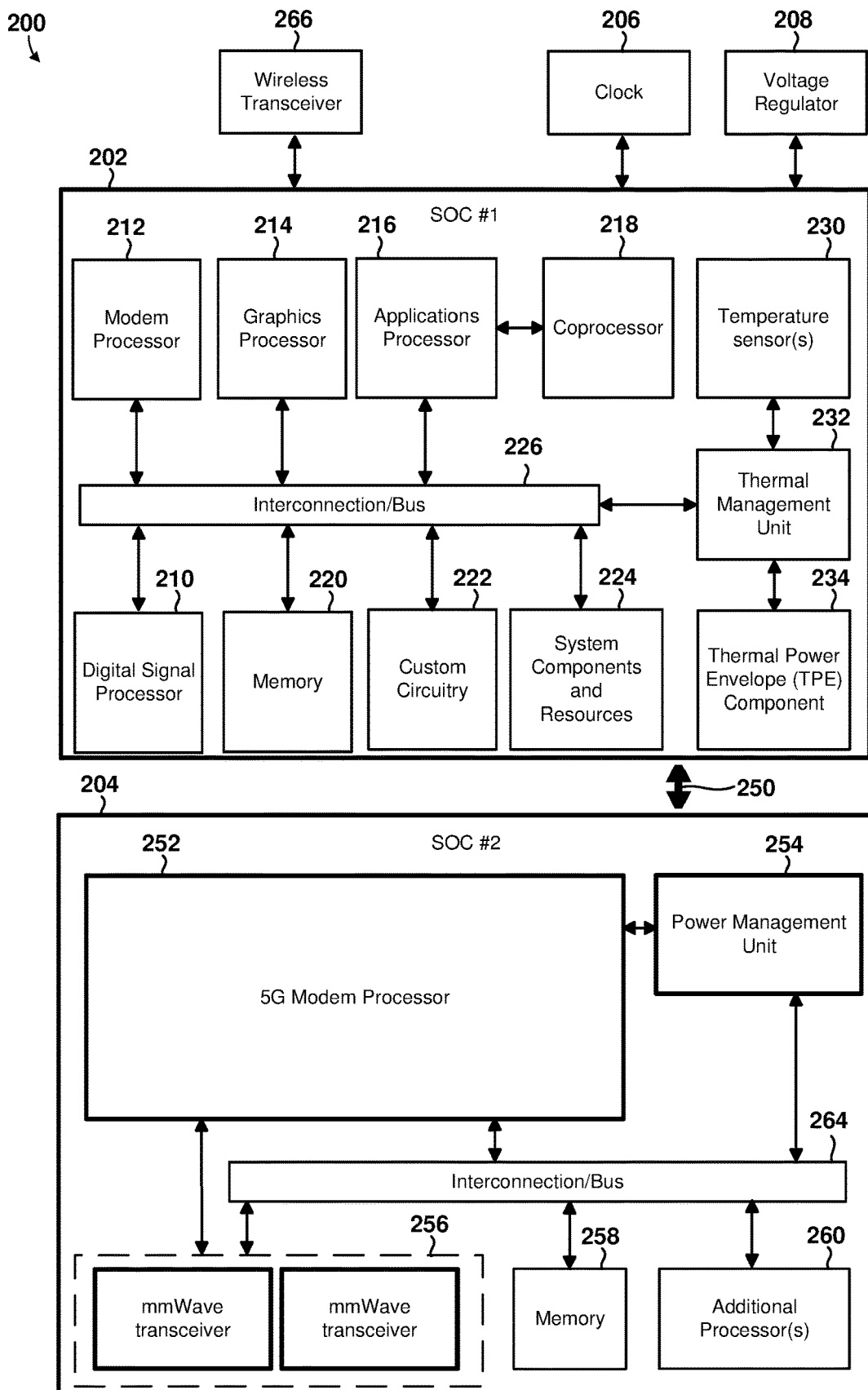
FIG. 2 is a component block diagram illustrating an example computing and wireless modem system suitable for implementing any of the various embodiments.

In some embodiments, two or more mobile devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a wireless device (e.g., 120a-120e) or a base station (e.g., 110a-110d). In some embodiments, the first SOC 202 may operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
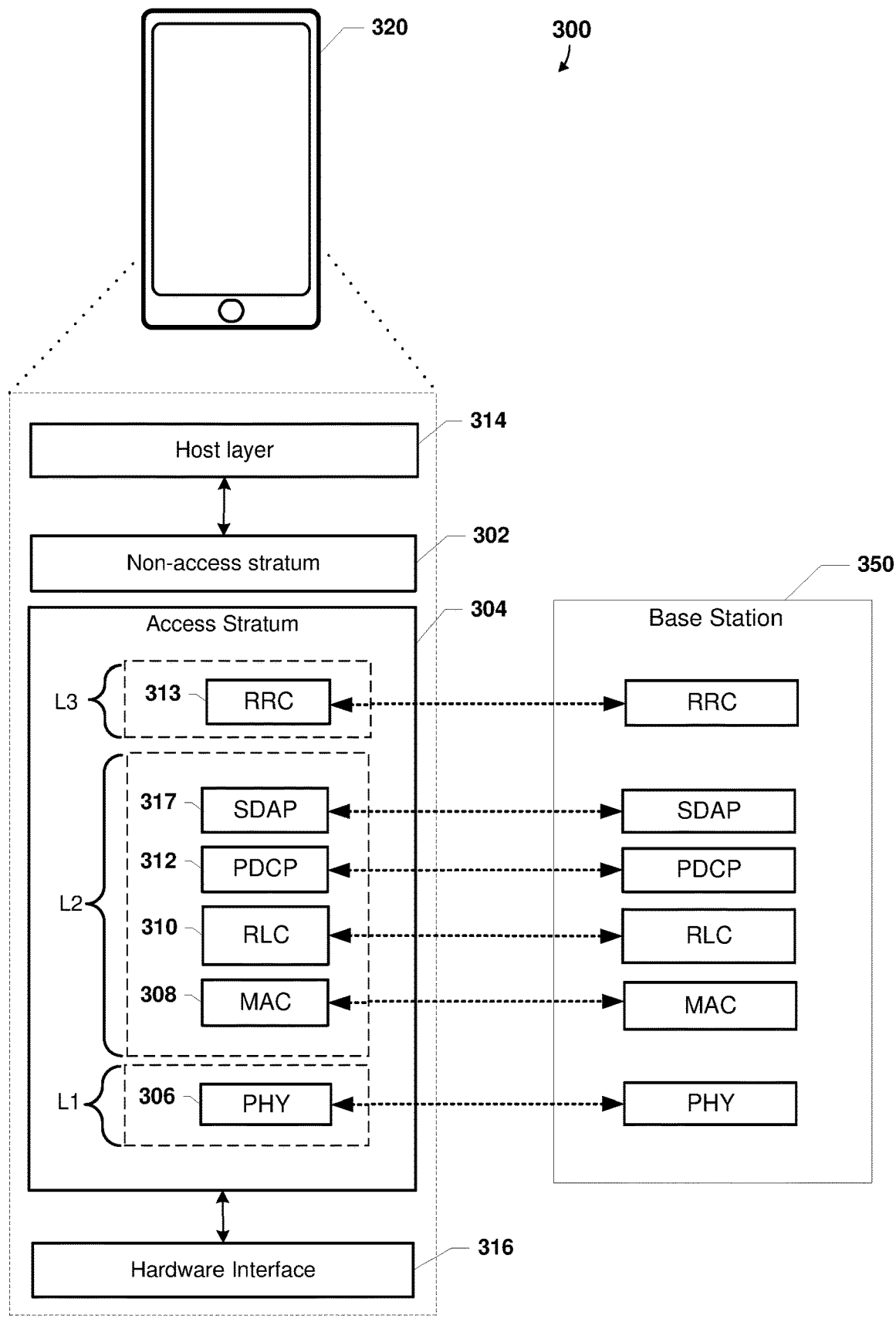
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base stations 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
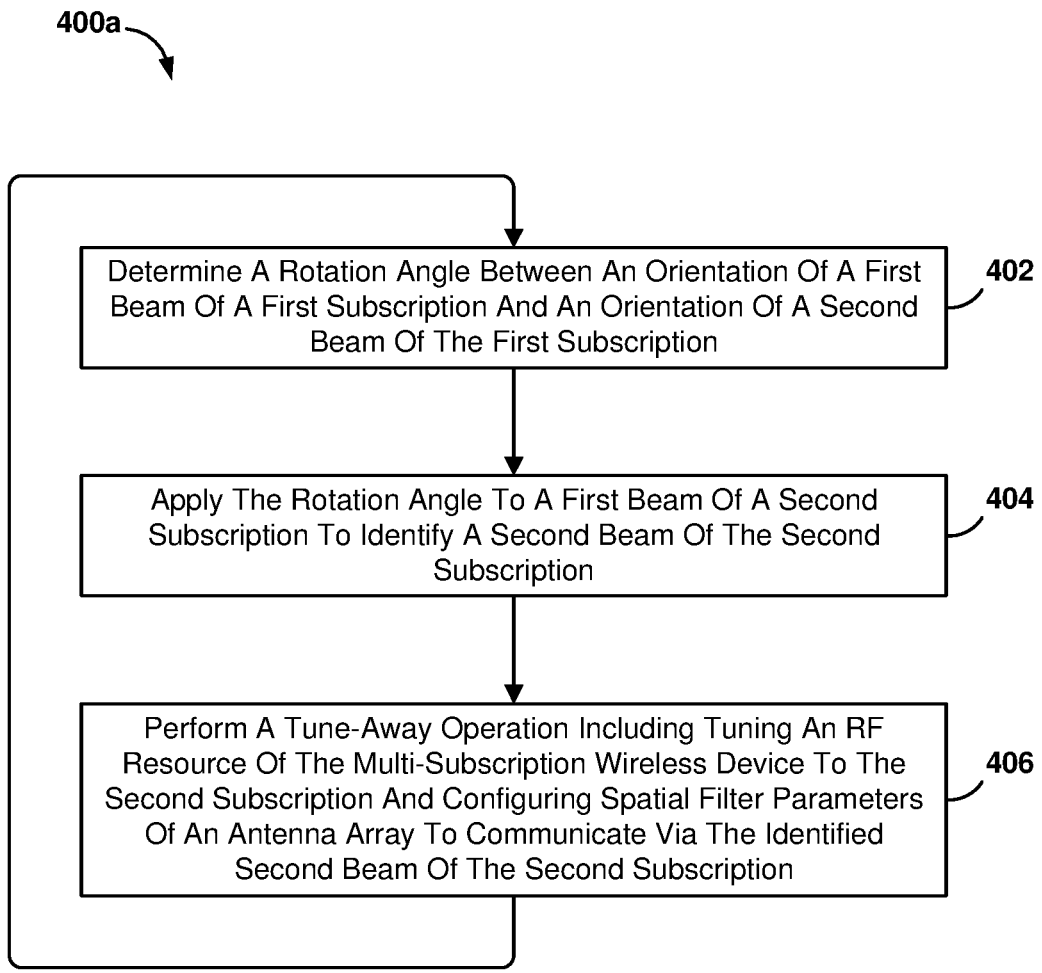
FIG. 4A is a process flow diagram illustrating a method for managing beam selection that may be performed by a processor of a multi-subscription wireless device according to various embodiments.
Figure 4B:
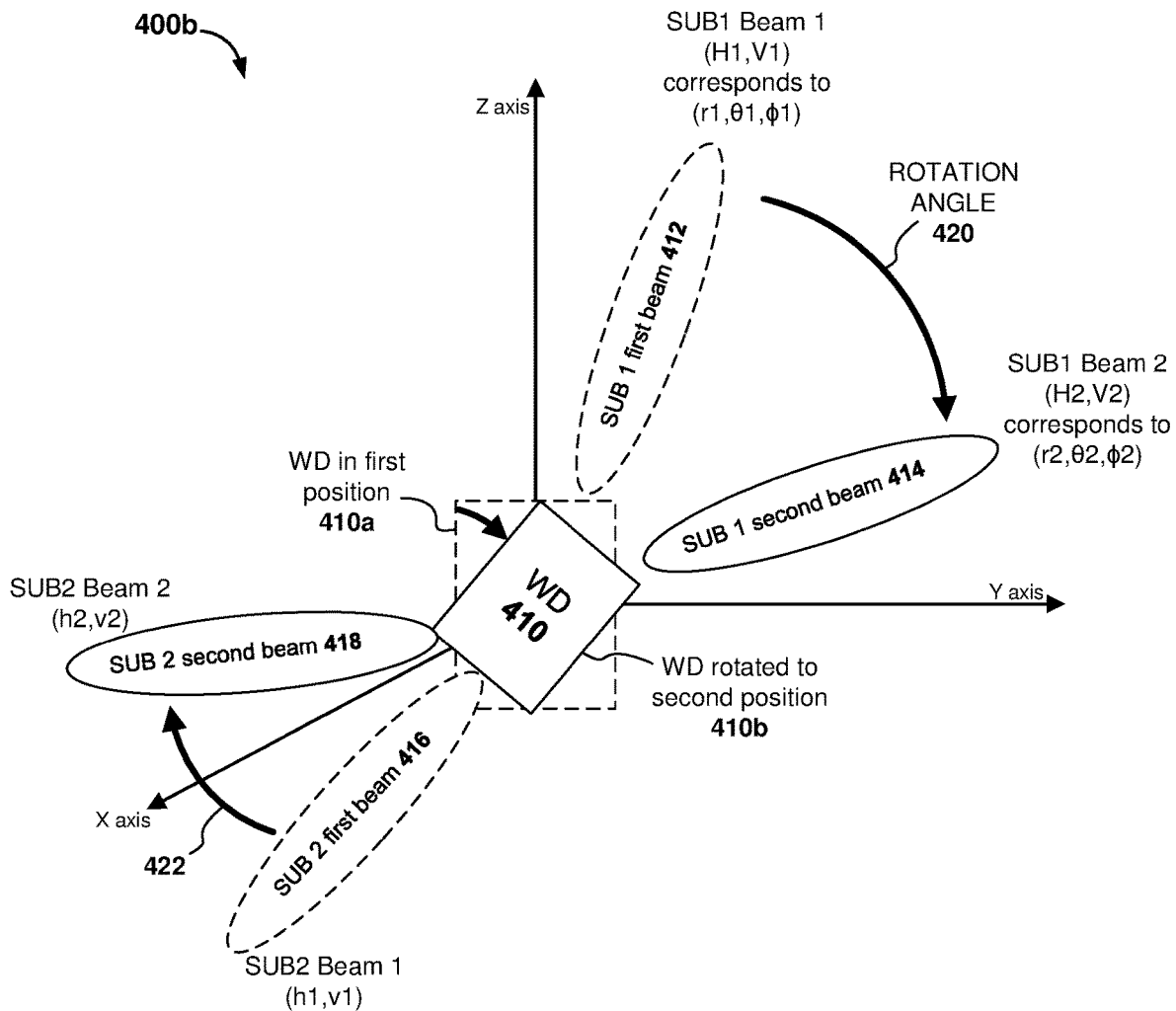
FIG. 4B is a conceptual diagram illustrating aspects of the method according to various embodiments.

FIG. 4A is a process flow diagram illustrating a method 400a for managing beam selection that may be performed by a processor of a multi-subscription wireless device according to various embodiments. FIG. 4B is a conceptual diagram illustrating aspects 400b of the method 400a according to various embodiments. With reference to FIGS. 1-4B, the method 400a may be implemented by a processor (e.g., 210, 212, 214, 216, 218, 252, 260) of a multi-subscription wireless device (e.g., the wireless device 120a-120e, 350).

In block 402, the processor may determine a rotation angle between an orientation of a first beam of a first subscription and an orientation of a second beam of the first subscription to which the wireless device has switched, such as in response to a beam switch operation. For example, referring to FIG. 4B, a wireless device 410 may rotate from a first position 410a to a second position 410b, which requires changing the beams used for receiving signals from a service cell (not shown). While in the first position 410a, the wireless device 410 may configure spatial filter parameters to receive and/or send signals on a first beam of a first subscription 412 (SUB 1 Beam 1). The first beam of the first subscription 412 may have a horizontal and vertical orientation H1,V1. The horizontal and vertical orientation H1,V1 may correspond to coordinates r1,θ1,ϕ1. While in the first position 410a, the wireless device 410 may configure spatial filter parameters (e.g., during a tune-away operation) to receive and/or send signals on a first beam of a second subscription 416 (SUB2 Beam 1). The first beam of the second subscription 416 may have a horizontal and vertical orientation h1,v1.

The wireless device 410 may then be rotated into a second position 410b. After rotation to the second position 410a, the wireless device 410 may configure spatial filter parameters to receive and/or send signals on a second beam of the first subscription 414 (SUB 1 Beam 2). The second beam of the first subscription 414 may have a horizontal and vertical orientation H2,V2. The horizontal and vertical orientation H2,V2 may correspond to coordinates r2,θ2,ϕ2. The processor may determine a rotation angle 420 between the orientation of the first beam of the first subscription 412 and the orientation of the second beam of the first subscription 414. Means for performing the operations in block 402 may include the processor (e.g., 210, 212, 214, 216, 218, 252, 260) and the wireless transceiver (e.g., 266).

Returning to FIG. 4A, in block 404, the processor may apply the rotation angle to a first beam of a second subscription to identify a second beam of the second subscription. For example, the processor may apply the rotation angle 420 to the first beam of the second subscription 416 (SUB2 Beam 1) to identify a second beam of the second subscription 418 (SUB2 Beam 2). In some embodiments, the processor may apply the rotation angle to a codebook that includes correlations between spatial coordinates of beams of the first subscription to orientations for beams of the second subscription. In such embodiments, the processor may identify the second beam of the second subscription based in part on a correlation obtained of the determined difference in rotation angle and the second beam of the second subscription.

In some embodiments, the codebook may include information such as a frequency band, a beam identifier, a phasor (or another suitable angle notation), a transmit device identifier, a receive device identifier, and antenna group value, a sub-array group value, and antenna type value, and amplitude, a phase, and azimuth, and elevation, and other suitable information. In some embodiments, the multi-subscription wireless device may determine a beam that corresponds to spatial location information (for example, theta and phi coordinates). In some embodiments, the multi-subscription wireless device may use the codebook to identify the second beam of the second subscription based in part on the correlation obtained of the determined difference in rotation angle and the second beam of the second subscription.

For example, the processor may determine an absolute displacement between the first beam of the first subscription 412 (SUB1 Beam 1) and the second beam of the first subscription 414 (SUB1 Beam 2) (FIG. 4B). In some embodiments, the absolute displacement between SUB1 Beam 1 and SUB1 Beam 2 may be represented as ||H1,V1 (r1,θ1,ϕ1)−H2,V2 (r2,θ2,ϕ2)||. In some embodiments, the absolute displacement between SUB1 Beam 1 and SUB1 Beam 2 may be represented as $\sqrt{r_1^2 + r_2^2 - 2r_1r_2[\sin(\theta_1)\sin(\theta_2)\cos(\theta_1-\theta_2) + \cos(\theta_1)\cos(\theta_2)]}$. In some embodiments, the absolute displacement may be represented as difference in coordinates between SUB1 Beam 1 and SUB1 Beam 2, such as $\gamma_\delta, \theta_\delta, \varnothing_\delta$.

The processor may apply the rotation angle 422 to the first beam of a second subscription 416 (SUB2 Beam 1) to identify a second beam of the second subscription 418 (SUB2 Beam 2). In some embodiments, the processor may apply absolute displacement as an input to the codebook to identify the second beam of the second subscription 418. In some embodiments, the second beam of the second subscription after rotation of the wireless device may be represented as $(\gamma_3', \theta_2', \varnothing_2') = ||h1,v1\text{ spatial coordinates} + \gamma_\delta, \theta_\delta, \varnothing_\delta||$. Means for performing the operations in block 404 may include the processor (e.g., 210, 212, 214, 216, 218, 252, 260).

In block 406, the processor may perform a tune-away operation including tuning an RF resource of the multi-subscription wireless device to the second subscription and configuring spatial filter parameters of an antenna array to communicate via the identified second beam of the second subscription. Means for performing the operations in block 406 may include the processor (e.g., 210, 212, 214, 216, 218, 252, 260) and the wireless transceiver (e.g., 266).

The processor may repeat the operations of blocks 402-406 from time to time, particularly when tune-away operations are performed.

Figure 4C:
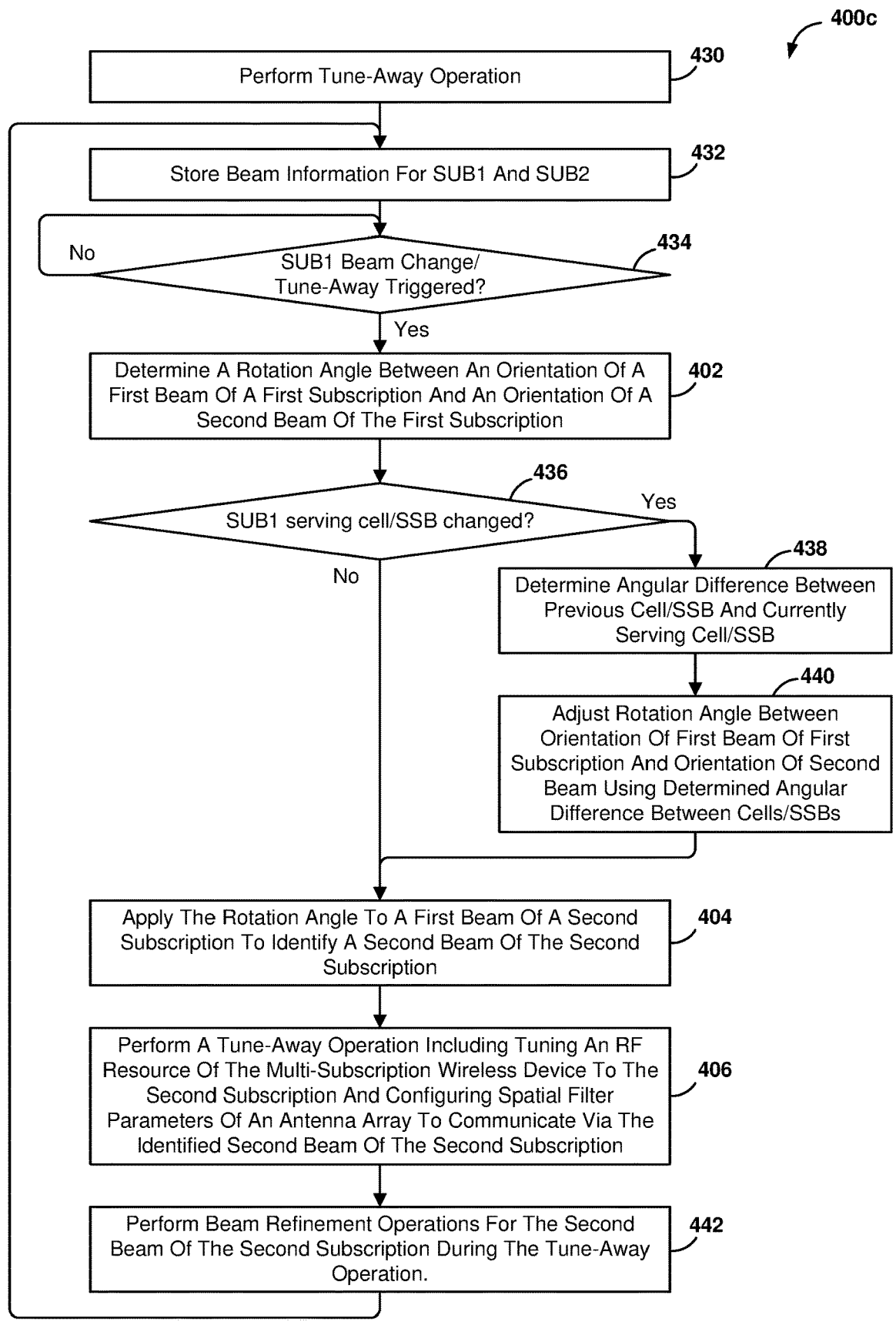
FIGS. 4C, 4D, 4E, 4F, and 4G are process flow diagrams illustrating operations that may be performed as part of the method for managing beam selection according to some embodiments.

FIG. 4C is a process flow diagram illustrating operations 400c that may be performed as part of the method 400a for managing beam selection according to some embodiments. With reference to FIGS. 1-4C, the operations 400c may be implemented by a processor (e.g., 210, 212, 214, 216, 218, 252, 260) of a multi-subscription wireless device (e.g., the wireless device 120a-120e, 350).

In block 430, the processor may perform a tune-away operation from the first subscription to the second subscription, and may return from the second subscription to the first subscription. Means for performing the operations in block 430 may include the processor (e.g., 210, 212, 214, 216, 218, 252, 260) and the wireless transceiver (e.g., 266).

In block 432, the processor may store beam information, such as coordinates, orientation information, and/or the like, for beams that the processor used to communicate with one or two base stations, including the first beam of the first subscription and the first beam of the second subscription. Means for performing the operations in block 432 may include the processor (e.g., 210, 212, 214, 216, 218, 252, 260).

In determination block 434, the processor may determine whether a beam of the first subscription has changed or whether a tune-away operation has been triggered.

In response to determining that a beam of the first subscription has not changed and that a tune-away operation has not been triggered (i.e., determination block 434="No"), the processor may continue to periodically perform the operations of determination block 434 as described.

In response to determining that a beam of the first subscription has changed or that a tune-away operation has been triggered (i.e., determination block 434="Yes"), the processor may determine a rotation angle between an orientation of a first beam of a first subscription and an orientation of a second beam of the first subscription in block 402 of the method 400a, as described. In other words, when a beam switch has happened in the first subscription since the last tune-away operation, the processor may determine an angle between the pointing direction of the first beam before the beam switch operation and the pointing direction of the second beam after the beam switch operation.

In determination block 436, the processor may determine whether a serving cell or SSB has changed for the first subscription. Means for performing the operations in block 436 may include the processor (e.g., 210, 212, 214, 216, 218, 252, 260) and the wireless transceiver (e.g., 266).

In response to determining that the serving cell or serving SSB has not changed for the first subscription (i.e., determination block 436="No"), the processor may apply the rotation angle to a first beam of a second subscription to identify a second beam of the second subscription in block 404 of the method 400a as described.

In response to determining that the serving cell or serving SSB has changed for the first subscription (i.e., determination block 436="No"), the processor may determine an angular difference between the previous cell and the currently serving cell, or between a previous SSB and the currently serving SSB in block 438. Means for performing the operations in block 438 may include the processor (e.g., 210, 212, 214, 216, 218, 252, 260) and the wireless transceiver (e.g., 266).

In block 440, the processor may adjust the rotation angle between the orientation of the first beam of the first subscription and the orientation of the second beam using the determined angular difference between the cells or SSBs. Means for performing the operations in block 440 may include the processor (e.g., 210, 212, 214, 216, 218, 252, 260).

Following the operations of block 440 the processor may apply the rotation angle to a first beam of a second subscription to identify a second beam of the second subscription in block 404 of them method 400a, and may perform a tune-away operation including tuning an RF resource of the multi-subscription wireless device to the second subscription and configuring spatial filter parameters of an antenna array to communicate via the identified second beam of the second subscription in block 406 of the method 400a, as described.

In block 442, the processor may perform beam refinement operations for the second beam of the second subscription during the tune-away operation. For example, the processor may perform operations to refine tuning and synchronization for signals received for the second subscription, such as minor frequency refinements, a tracking loop, and/or the like. Means for performing the operations in block 442 may include the processor (e.g., 210, 212, 214, 216, 218, 252, 260) and the wireless transceiver (e.g., 266).

The processor may then store beam information for SUB2 following the tune-away in block 432 as described.

Figure 4D:
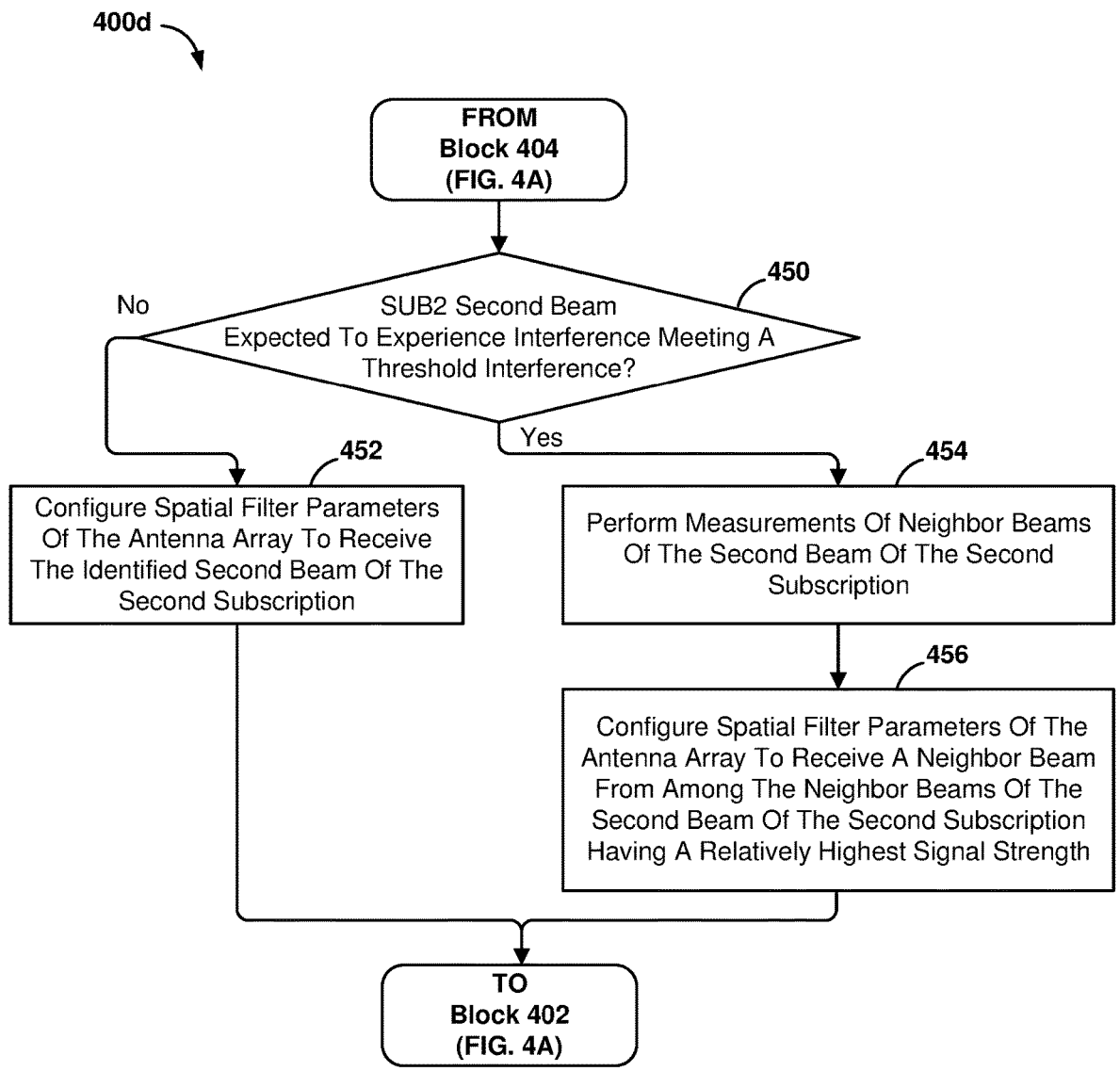

FIG. 4D is a process flow diagram illustrating operations 400d that may be performed as part of the method 400a for managing beam selection according to various embodiments. With reference to FIGS. 1-4D, the operations 400d may be implemented by a processor (e.g., 210, 212, 214, 216, 218, 252, 260) of a multi-subscription wireless device (e.g., the wireless device 120a-120e, 350).

After applying the rotation angle to a first beam of a second subscription to identify a second beam of the second subscription in block 404 as described, the processor may determine whether the second beam of the second subscription is expected to experience interference meeting a threshold interference in determination block 450. In some embodiments, the processor may determine whether the second beam of the second subscription is included in a disallowed beam list. Means for performing the operations in determination block 450 may include the processor (e.g., 210, 212, 214, 216, 218, 252, 260) and the wireless transceiver (e.g., 266).

In response to determining that the second beam of the second subscription is not expected to experience interference meeting a threshold interference in determination (i.e., determination block 450="No"), the processor may configure spatial filter parameters of the antenna array to communicate via the identified second beam of the second subscription in response to determining that the second beam of the second subscription in block 452. Means for performing the operations in block 452 may include the processor (e.g., 210, 212, 214, 216, 218, 252, 260) and the wireless transceiver (e.g., 266).

Following the operations of block 452, the processor may determine a rotation angle between an orientation of a first beam of a first subscription and an orientation of a second beam of the first subscription in block 402 of the method 400a as described.

In response to determining that the second beam of the second subscription is expected to experience interference meeting a threshold interference in determination (i.e., determination block 450="Yes"), the processor may perform measurements of neighbor beams of the second beam of the second subscription in block 454. In some embodiments, the processor may identify one or more neighbor beams of the second beam of the second subscription using information from the codebook. Means for performing the operations in block 454 may include the processor (e.g., 210, 212, 214, 216, 218, 252, 260) and the wireless transceiver (e.g., 266).

In block 456, the processor may configure spatial filter parameters of the antenna array to receive a neighbor beam from among the neighbor beams of the second beam of the second subscription having a relatively highest signal strength. Means for performing the operations in block 456 may include the processor (e.g., 210, 212, 214, 216, 218, 252, 260) and the wireless transceiver (e.g., 266).

Following the operations of block 456, the processor may determine a rotation angle between an orientation of a first beam of a first subscription and an orientation of a second beam of the first subscription in block 402 of the method 400a as described.

Figure 4E:
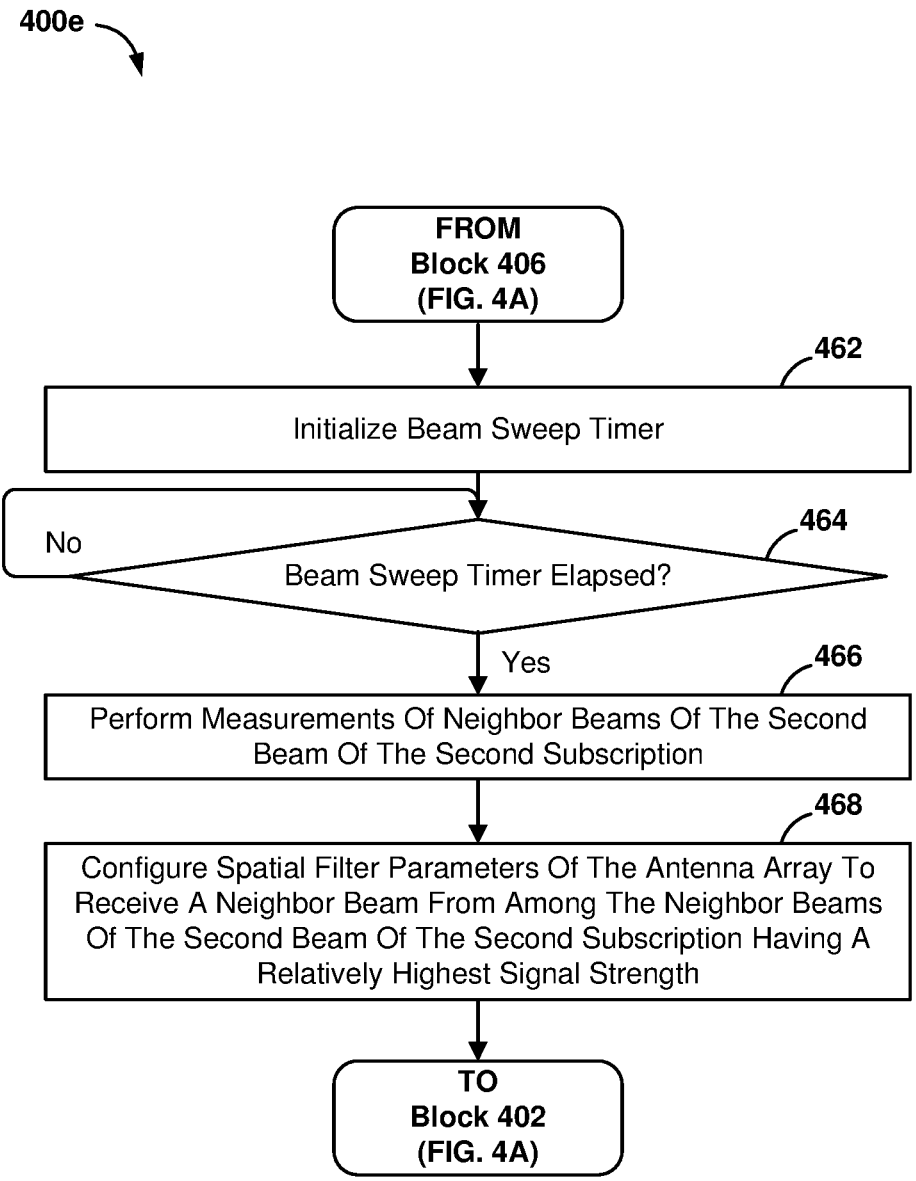

FIG. 4E is a process flow diagram illustrating operations 400e that may be performed as part of the method 400a for managing beam selection according to various embodiments. With reference to FIGS. 1-4E, the operations 400e may be implemented by a processor (e.g., 210, 212, 214, 216, 218, 252, 260) of a multi-subscription wireless device (e.g., the wireless device 120a-120e, 350).

After performing a tune-away operation including tuning an RF resource of the multi-subscription wireless device to the second subscription and configuring spatial filter parameters of an antenna array to communicate via the identified second beam of the second subscription in block 406 of the method 400a as described, the processor may initialize a beam sweep timer in block 462. Means for performing the operations in block 462 may include the processor (e.g., 210, 212, 214, 216, 218, 252, 260) and the wireless transceiver (e.g., 266).

In determination block 464, the processor may determine whether the beam sweep timer has elapsed. Means for performing the operations in block 464 may include the processor (e.g., 210, 212, 214, 216, 218, 252, 260).

In response to determining that the beam sweep timer has not elapsed (i.e., determination block 464="No"), the processor may continue to determine whether the beam sweep timer has elapsed in determination block 464.

In response to determining that the beam sweep timer has elapsed (i.e., determination block 464="Yes"), the processor may perform measurements of neighbor beams of the second beam of the second subscription in block 466. Means for performing the operations in block 466 may include the processor (e.g., 210, 212, 214, 216, 218, 252, 260) and the wireless transceiver (e.g., 266).

In block 468, the processor may configure spatial filter parameters of the antenna array to receive a neighbor beam from among multiple neighbor beams of the second beam of the second subscription by selecting a neighbor beam with a relatively highest signal strength. In this manner, the processor may perform beam correction and maintenance operations to improve the sending and/or receiving of signals on the second subscription. Means for performing the operations in block 468 may include the processor (e.g., 210, 212, 214, 216, 218, 252, 260) and the wireless transceiver (e.g., 266).

Following performance of the operations of block 468, the processor may determine a rotation angle between an orientation of a first beam of a first subscription and an orientation of a second beam of the first subscription in block 402 of the method 400a as described.

Figure 4F:
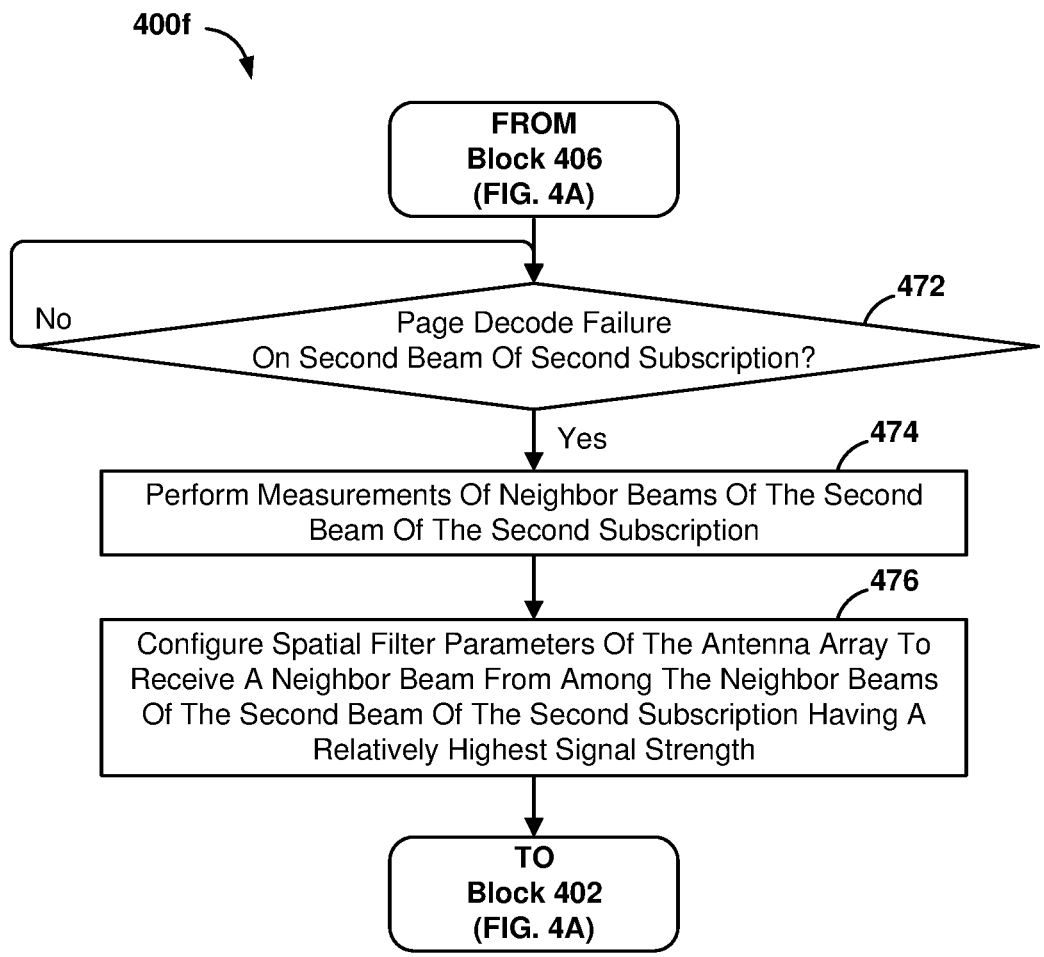

FIG. 4F is a process flow diagram illustrating operations 400f that may be performed as part of the method 400a for managing beam selection according to various embodiments. With reference to FIGS. 1-4F, the operations 400f may be implemented by a processor (e.g., 210, 212, 214, 216, 218, 252, 260) of a multi-subscription wireless device (e.g., the wireless device 120a-120e, 350).

After performing a tune-away operation including tuning an RF resource of the multi-subscription wireless device to the second subscription and configuring spatial filter parameters of an antenna array to communicate via the identified second beam of the second subscription in block 406 of the method 400a as described, the processor may determine whether a page decode failure has occurred on the second beam of the second subscription in determination block 472. Means for performing the operations in determination block 472 include the processor (e.g., 210, 212, 214, 216, 218, 252, 260) and the wireless transceiver (e.g., 266).

In response to determining that a page decode failure on the second beam of the second subscription has not occurred (i.e., determination block 472="No"), the processor may continue to perform the operations of determination block 472, at least during the performance of the tune-away operation from the first subscription to the second subscription.

In response to determining that a page decode failure on the second beam of the second subscription has occurred (i.e., determination block 472="Yes"), the processor may perform measurements of neighbor beams of the second beam of the second subscription in block 474. Means for performing the operations in block 474 may include the processor (e.g., 210, 212, 214, 216, 218, 252, 260) and the wireless transceiver (e.g., 266).

In block 476, the processor may configure spatial filter parameters of the antenna array to receive a neighbor beam from among the neighbor beams of the second beam of the second subscription for a neighbor beam having a relatively highest signal strength. Means for performing the operations in block 476 may include the processor (e.g., 210, 212, 214, 216, 218, 252, 260) and the wireless transceiver (e.g., 266).

Following performance of the operations of block 476, the processor may determine a rotation angle between an orientation of a first beam of a first subscription and an orientation of a second beam of the first subscription in block 402 of the method 400a as described.

Figure 4G:
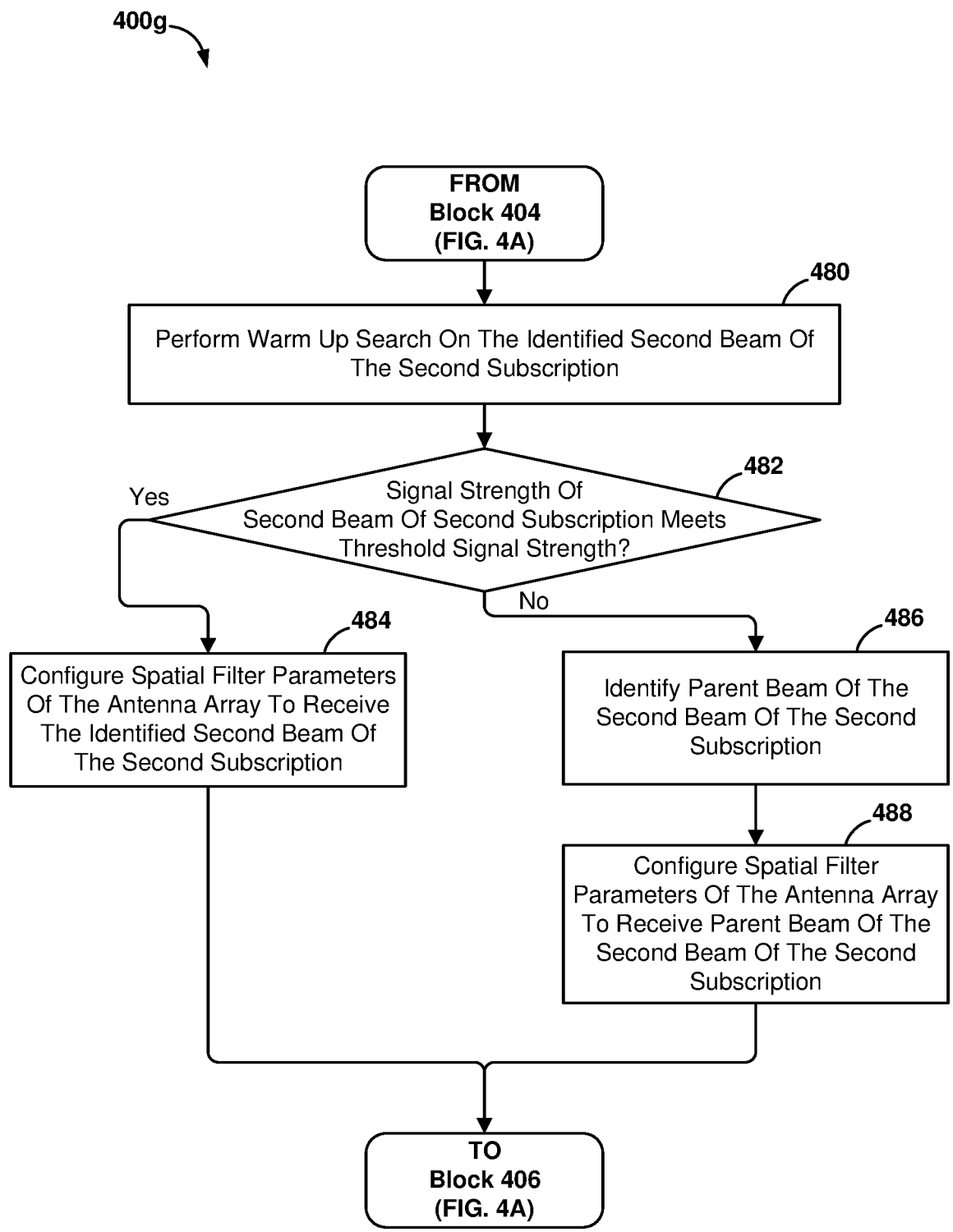

FIG. 4G is a process flow diagram illustrating operations 400g that may be performed as part of the method 400a for managing beam selection according to various embodiments. With reference to FIGS. 1-4G, the operations 400g may be implemented by a processor (e.g., 210, 212, 214, 216, 218, 252, 260) of a multi-subscription wireless device (e.g., the wireless device 120a-120e, 350).

After the processor applies the rotation angle to a first beam of a second subscription to identify a second beam of the second subscription in block 404 as described, the processor may perform a warm up search on the identified second beam of the second subscription in block 480. Through the warm up search the processor may determine, for example, a signal strength of the identified second beam of the second subscription. Means for performing the operations in block 480 may include the processor (e.g., 210, 212, 214, 216, 218, 252, 260) and the wireless transceiver (e.g., 266).

In determination block 482, the processor may determine whether a signal strength of the second beam of the second subscription meets a threshold signal strength. Means for performing the operations in determination block 482 may include the processor (e.g., 210, 212, 214, 216, 218, 252, 260).

In response to determining that the signal strength of the second beam of the second subscription meets the threshold signal strength (i.e., determination block 482="Yes"), the processor may configure the spatial filter parameters of the antenna array to communicate via the identified second beam of the second subscription in block 484. Means for performing the operations in block 484 may include the processor (e.g., 210, 212, 214, 216, 218, 252, 260) and the wireless transceiver (e.g., 266).

Following performance of the operations of block 484, the processor may perform the operations of block 406 of the method 400a as described.

In response to determining that the signal strength of the second beam of the second subscription does not meet the threshold signal strength (i.e., determination block 482="No"), the processor may identify a parent beam of the second beam of the second subscription in block 486. In some embodiments, the processor may identify the parent beam of the second beam of the second subscription from information in the codebook. Means for performing the operations in block 486 may include the processor (e.g., 210, 212, 214, 216, 218, 252, 260).

In block 488, the processor may configure spatial filter parameters of the antenna array to receive a parent beam of the second beam of the second subscription. Means for performing the operations in block 488 may include the processor (e.g., 210, 212, 214, 216, 218, 252, 260) and the wireless transceiver (e.g., 266).

Following the performance of the operations of block 488, the processor may perform the operations of block 406 of the method 400a as described.

Figure 5A:
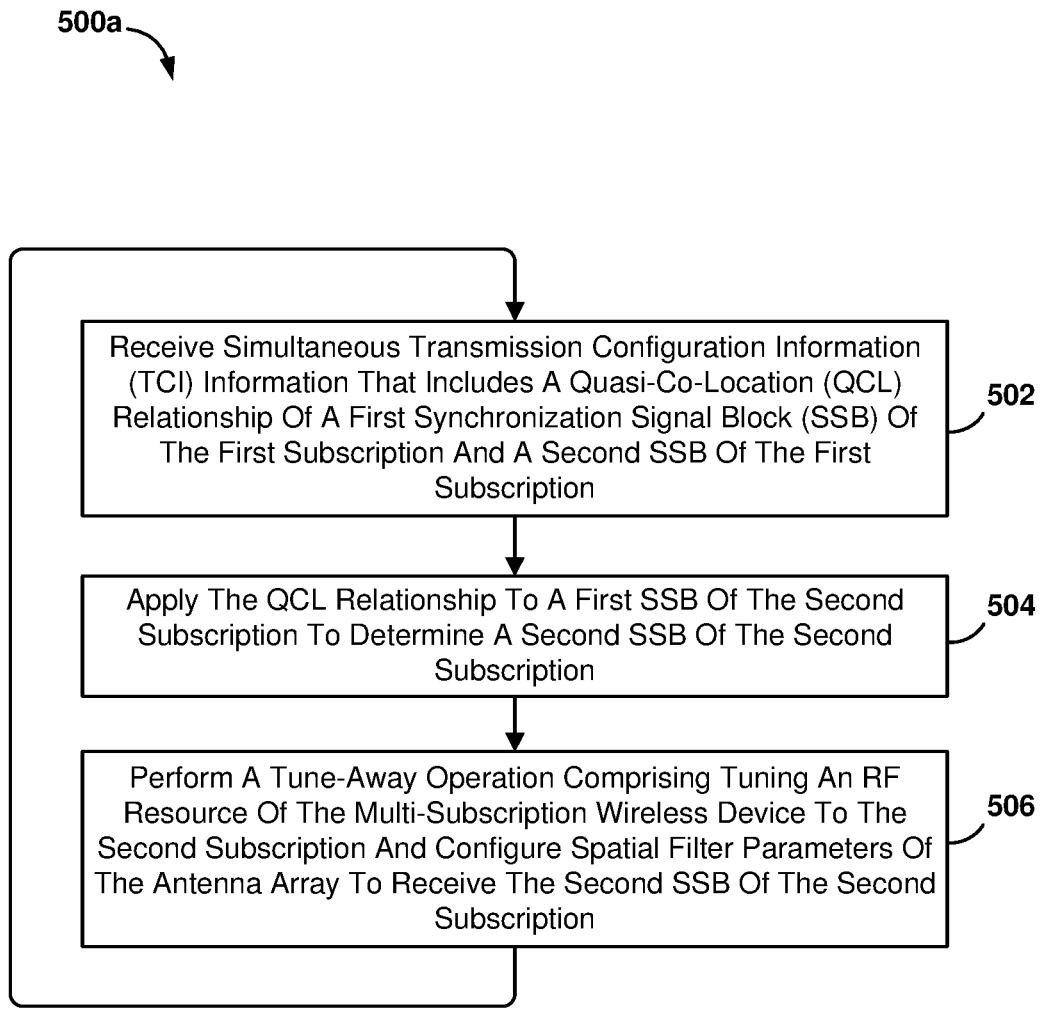
FIG. 5A is a process flow diagram illustrating a method for managing beam selection that may be performed by a processor of a multi-subscription wireless device according to various embodiments.
Figure 5B:
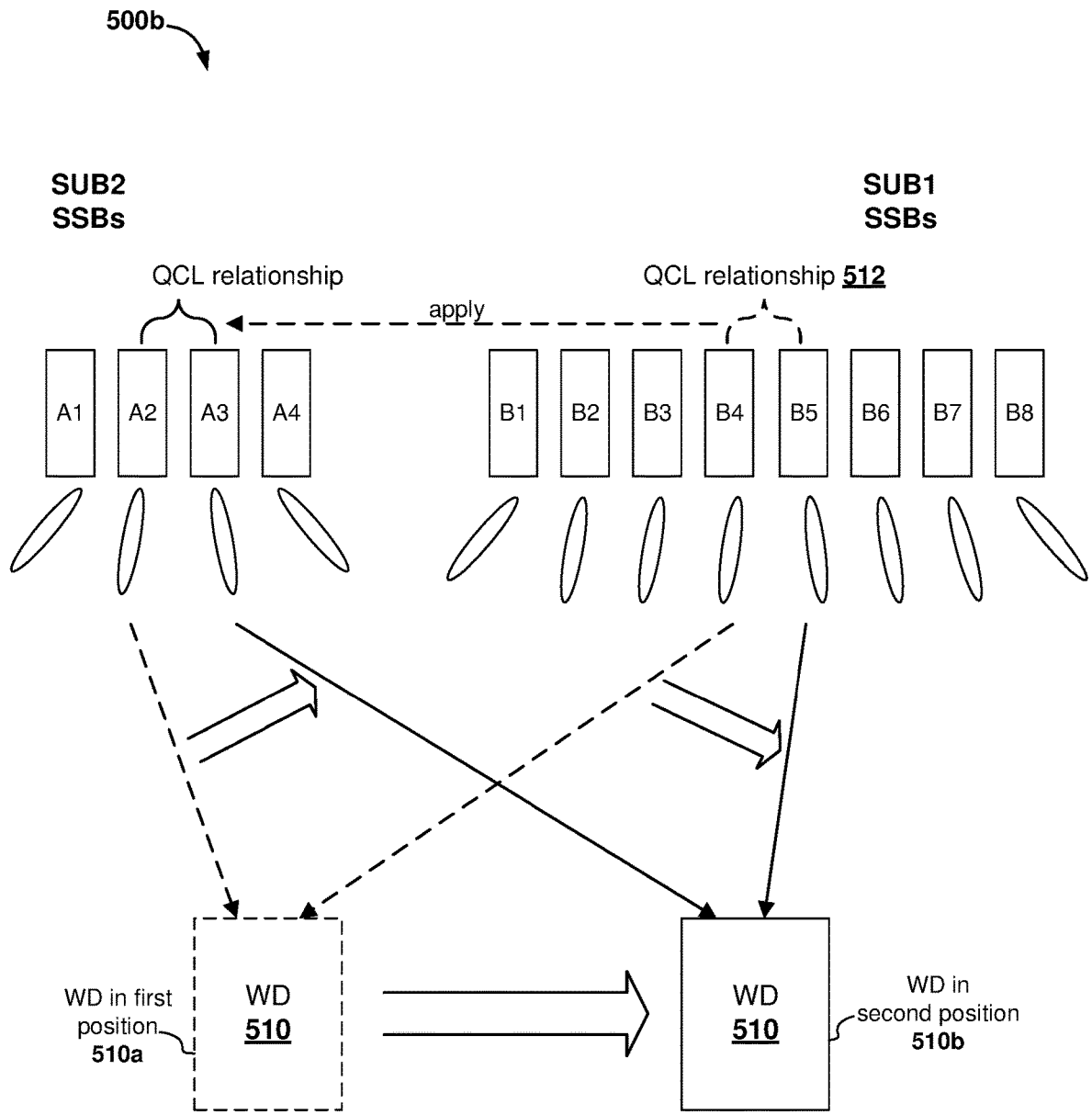
FIG. 5B is a conceptual diagram illustrating aspects of the operations according to various embodiments.

FIG. 5A is a process flow diagram illustrating operations a method 500a managing beam selection according to various embodiments. FIG. 5B is a conceptual diagram illustrating aspects 500b of the method 500a according to some embodiments. With reference to FIGS. 1-5B, the operations of the method 500a may be implemented by a processor (e.g., 210, 212, 214, 216, 218, 252, 260) of a multi-subscription wireless device (e.g., the wireless device 120a-120e, 350). In some embodiments, the multi-subscription wireless device may perform operations to improve the determination a Synchronization Signal Block (SSB) of the second subscription.

In block 502, the processor may receive simultaneous Transmission Configuration Information (TCI) information that includes a Quasi-Co-Location (QCL) relationship of a first Synchronization Signal Block (SSB) of the first subscription and a second SSB of the first subscription. In some embodiments, the multi-subscription wireless device may receive the TCI information from a base station. In some embodiments, the base station may transmit TCI information in configuration signaling, for example in a message such as simultaneousTCI-UpdateList, simultaneousTCI-UpdateListSecond, simultaneousTCI-UpdateList-r16, simultaneousTCI-UpdateListSecond-r16, and/or another suitable message or signaling.

For example, referring to FIG. 5B, while a wireless device 510 is in a first position 510a, the wireless device 510 may configure spatial filter parameters to receive signals on a first SSB of a first subscription (SUB1 SSB B5), and to receive signals on a first SSB of a second subscription (SUB2 SSB A2). In some embodiments, the processor may receive a signal or instruction (e.g., in a MAC CE (Medium Access Control-Control Element), DCI (Downlink Control Information), or RRC (Radio Resource Control) reconfiguration signal) to switch from a first SSB in the first subscription to a second SSB in the first subscription. The processor may switch SSBs in the first subscription from SUB1 SSB B5 to SUB1 SSB B6. TCI information received from the base station may indicate that SUB1 SSB B5 to SUB1 SSB B6 has a QCL relationship 512. Means for performing the operations in block 502 may include the processor (e.g., 210, 212, 214, 216, 218, 252, 260) and the wireless transceiver (e.g., 266).

In block 504, the processor may apply the QCL relationship to the first SSB of the second subscription to determine a second SSB of the second subscription. For example, the processor may apply the QCL relationship 512 of SUB1 SSB B5 and SUB1 SSB B6 to the first SSB of the second subscription SUB2 SSB A2. The processor may identify a second SSB of the second subscription, SUB2 SSB A3, as having an analogous QCL relationship to the QCL relationship 512 of SUB1 SSB B5 and SUB1 SSB B6. Means for performing the operations in block 504 may include the processor (e.g., 210, 212, 214, 216, 218, 252, 260).

In block 506, the processor may perform a tune-away operation comprising tuning an RF resource of the multi-subscription wireless device to the second subscription and configure spatial filter parameters of the antenna array to receive the second SSB of the second subscription. In some embodiments, the processor may perform no SSB measurements of the second SSB of the second subscription SUB2 SSB A3 for configuring the spatial filter parameters to receive SUB2 SSB A3. Means for performing the operations in block 506 may include the processor (e.g., 210, 212, 214, 216, 218, 252, 260) and the wireless transceiver (e.g., 266).

In some embodiments, the multi-subscription wireless device may perform one or more of the above-described operations prior to performing a tune-away operation, and in this manner reduce memory sharing between the first subscription and the second subscription, as well as reducing processor load and overhead. For example, in some embodiments, prior to a tune-away operation (e.g., before a tune-away operation is triggered, or before performing a triggered tune-away operation) the multi-subscription wireless device may receive the simultaneous TCI information that includes a QCL relationship of a first SSB of the first subscription and a second SSB of the first subscription, and may apply the QCL relationship to a first SSB of the second subscription to determine a second SSB of the second subscription.

The processor may repeat the operations of blocks 502-506 from time to time.

Figure 5C:
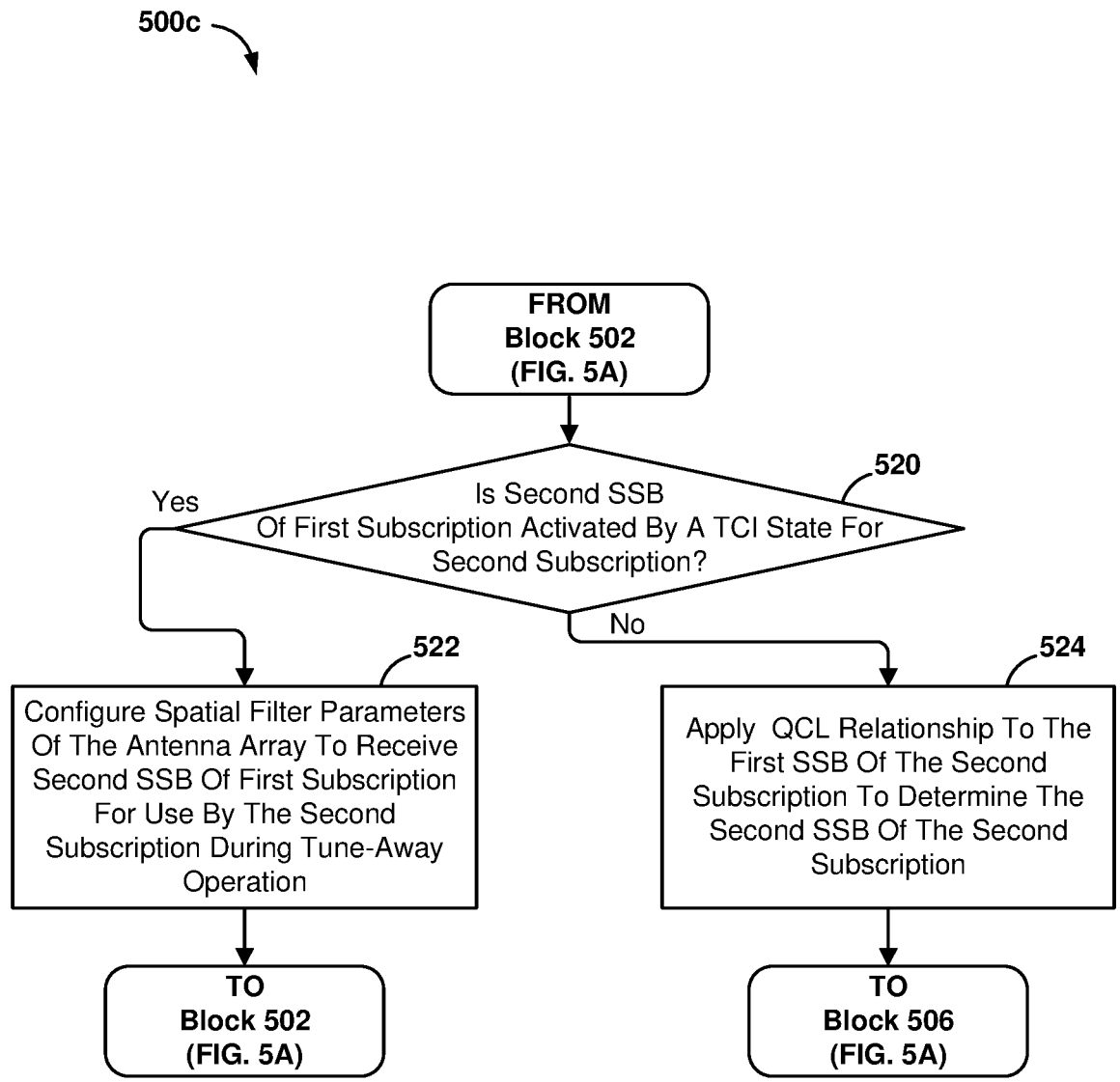
FIGS. 5C and 5D are process flow diagrams illustrating operations that may be performed as part of the method for managing beam selection according to some embodiments.

FIG. 5C is a process flow diagram illustrating operations 500c that may be performed as part of the method 500a for managing beam selection according to some embodiments. With reference to FIGS. 1-5C, the operations 500c may be implemented by a processor (e.g., 210, 212, 214, 216, 218, 252, 260) of a multi-subscription wireless device (e.g., the wireless device 120a-120e, 350).

After receiving simultaneous Transmission Configuration Information (TCI) information that includes a Quasi-Co-Location (QCL) relationship of a first Synchronization Signal Block (SSB) of the first subscription and a second SSB of the first subscription in block 502 as described, the processor may determine whether the second SSB of the first subscription is activated by a TCI state for the second subscription in determination block 520. Means for performing the operations in determination block 520 may include the processor (e.g., 210, 212, 214, 216, 218, 252, 260).

In response to determining that the second SSB of the first subscription is activated by a TCI state for the second subscription (i.e., determination block 520="Yes"), the processor may configure spatial filter parameters of the antenna array to receive the second SSB of the first subscription for use by the second subscription during the tune-away operation in block 522. Means for performing the operations in block 522 may include the processor (e.g., 210, 212, 214, 216, 218, 252, 260) and the wireless transceiver (e.g., 266).

Following the performance of the operations of block 522, the processor may receive simultaneous Transmission Configuration Information (TCI) information that includes a Quasi-Co-Location (QCL) relationship of a first Synchronization Signal Block (SSB) of the first subscription and a second SSB of the first subscription in block 502 of the method 500a (FIG. 5A) as described.

In response to determining that the second SSB of the first subscription is not activated by a TCI state for the second subscription (i.e., determination block 520="No"), the processor may apply the QCL relationship to the first SSB of the second subscription to determine the second SSB of the second subscription by applying the QCL relationship to the first SSB of the second subscription to determine the second SSB of the second subscription in block 524. Means for performing the operations in block 524 may include the processor (e.g., 210, 212, 214, 216, 218, 252, 260) and the wireless transceiver (e.g., 266).

Following performance of the operations of block 524, the processor may configure spatial filter parameters of the antenna array to receive the second SSB of the second subscription in block 506 of the method 500a (FIG. 5A) as described.

Figure 5D:
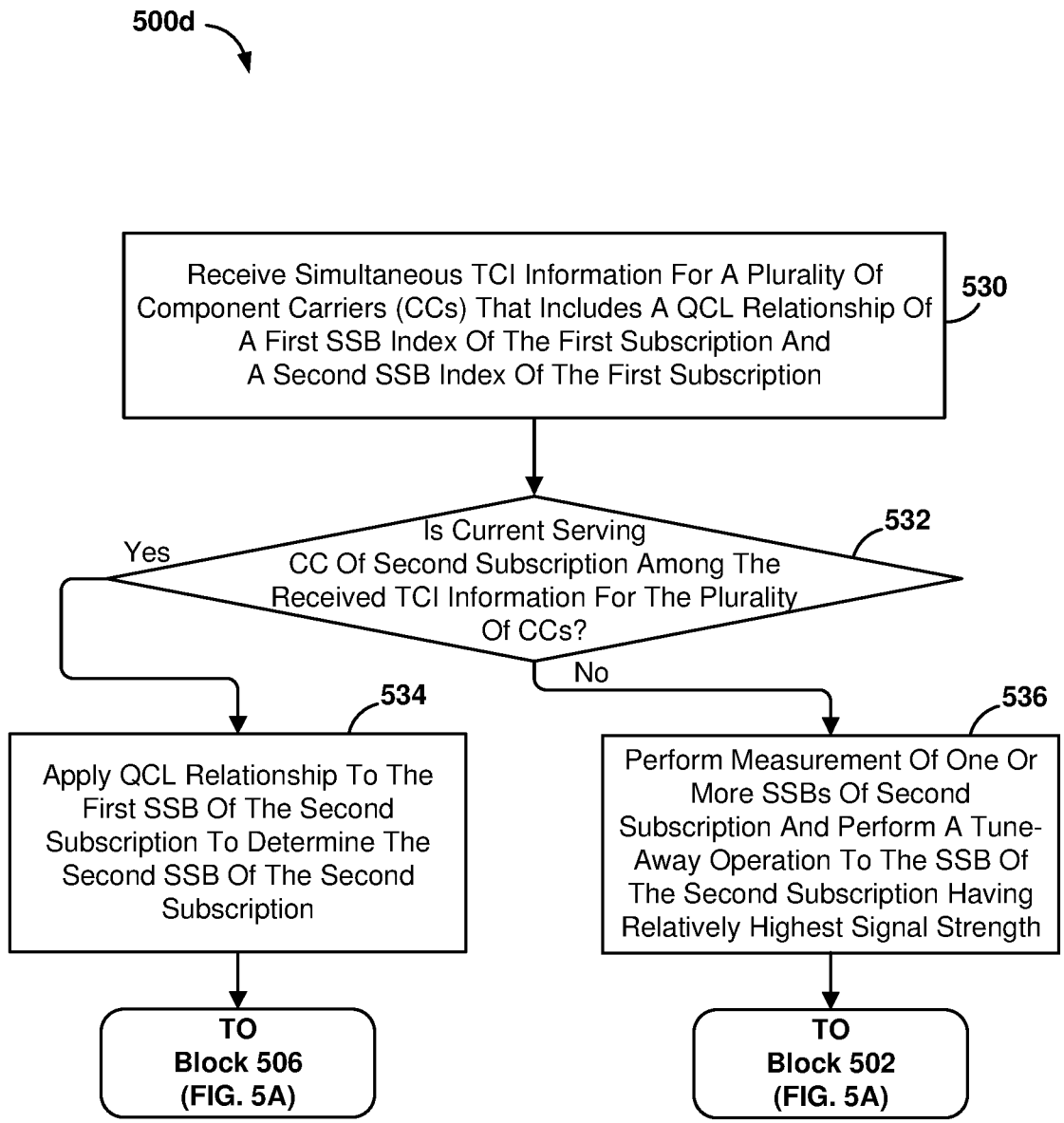

FIG. 5D is a process flow diagram illustrating operations 500d that may be performed as part of the method 500a for managing beam selection according to some embodiments. With reference to FIGS. 1-5D, the operations 500d may be implemented by a processor (e.g., 210, 212, 214, 216, 218, 252, 260) of a multi-subscription wireless device (e.g., the wireless device 120a-120e, 350).

In block 530, the processor may receive simultaneous TCI information for a plurality of component carriers that includes a QCL relationship of a first SSB index of a first subscription and a second SSB index of the first subscription. In some embodiments, the first SSB index may include a first serving SSB index of the first subscription. In some embodiments, the processor may perform the operations of block 530 as part of or together with the operations of block 502 (FIG. 5A). Means for performing the operations in block 530 may include the processor (e.g., 210, 212, 214, 216, 218, 252, 260) and the wireless transceiver (e.g., 266).

In determination block 532, the processor may determine whether a current serving component carrier of the second subscription is among the plurality of component carriers. Means for performing the operations in determination block 532 may include the processor (e.g., 210, 212, 214, 216, 218, 252, 260).

In response to determining that the current serving component carrier of the second subscription is among the plurality of component carriers (i.e., determination block 532="Yes"), the processor may applying the QCL relationship to the first SSB of a second subscription to determine the second SSB of the second subscription in block 534. Means for performing the operations in block 534 may include the processor (e.g., 210, 212, 214, 216, 218, 252, 260). Thereafter, the processor may perform the operations of block 506 of the method 500a as described.

In response to determining that the current serving component carrier of the second subscription is not among the plurality of component carriers (i.e., determination block 532="No"), the processor may perform a measurement of one or more SSBs of the second subscription, and may perform a tune-away operation to an SSB of the second subscription having the relatively highest signal strength (i.e., from among the one or more SSBs of the second subscription in block 536. Means for performing the operations in block 534 may include the processor (e.g., 210, 212, 214, 216, 218, 252, 260) and the wireless transceiver (e.g., 266). Thereafter, the processor may perform the operations of block 502 of the method 500 as described.

Figure 6:
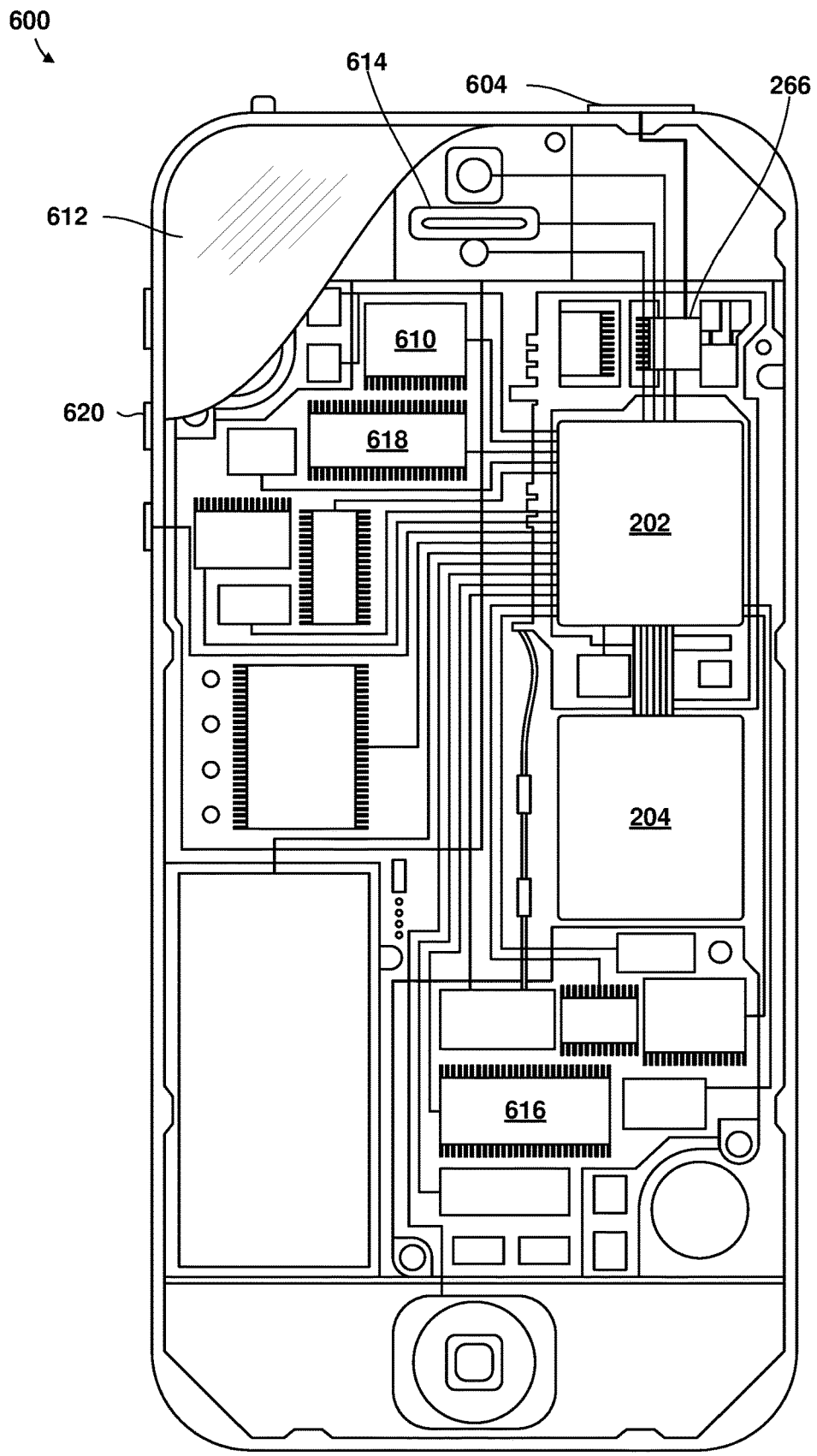
FIG. 6 is a component block diagram of a wireless device suitable for use with various embodiments.

FIG. 6 is a component block diagram of a wireless device 600 suitable for use with various embodiments. With reference to FIGS. 1-6, various embodiments, including the methods and operations 400a, 400c, 400d, 400e, 400f, 400g, 500a, and 500c, may be performed in a variety of wireless devices (e.g., the wireless device 120a-120e, 200, 320,), such as the wireless device 600. The wireless device 600 may include a first SOC 202 (e.g., a SOC-CPU) coupled to a second SOC 204 (e.g., a 5G capable SOC). The first and second SOCs 202, 204 may be coupled to internal memory 220, 258, 616, 618, a display 612, and to a speaker 614. Additionally, the wireless device 600 may include an antenna 604 for sending and receiving electromagnetic radiation that may be connected to a wireless data link and/or cellular telephone transceiver 266 coupled to one or more processors in the first and/or second SOCs 202, 204. The wireless device 600 may also include menu selection buttons or rocker switches 620 for receiving user inputs.

The wireless device 600 also may include a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 610 may include a digital signal processor (DSP) circuit (not shown separately).

The processors of the wireless device 600 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 220, 258, 616, 618 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods or operations 400a, 400c, 400d, 400e, 400f, 400g, 500a, 500c, and 500d may be substituted for or combined with one or more operations of the methods or operations 400a, 400c, 400d, 400e, 400f, 400g, 500a, 500c, and 500d.

Implementation examples are described in the following paragraphs. While some of the following implementation examples are described in terms of example methods, further example implementations may include: the example methods discussed in the following paragraphs implemented by a multi-subscription wireless device including a processor configured with processor-executable instructions to perform operations of the methods of the following implementation examples; the example methods discussed in the following paragraphs implemented by a multi-subscription wireless device including means for performing functions of the methods of the following implementation examples; and the example methods discussed in the following paragraphs may be implemented as a non-transitory processor-readable storage medium having stored thereon processor-executable instructions configured to cause a processor of a multi-subscription wireless device to perform the operations of the methods of the following implementation examples.

Example 1. A method performed by a processor of a multi-subscription wireless device for managing beam selection, including determining a rotation angle between an orientation of a first beam of a first subscription and an orientation of a second beam of the first subscription, applying the rotation angle to a first beam of a second subscription to identify a second beam of the second subscription, and performing a tune-away operation including tuning a radio frequency (RF) resource of the multi-subscription wireless device to the second subscription and configuring spatial filter parameters of an antenna array to communicate via the identified second beam of the second subscription.

Example 2. The method of example 1, in which determining the rotation angle between the orientation of the first beam of the first subscription and the orientation of the second beam of the first subscription includes determining the rotation angle between the orientation of the first beam of the first subscription and the orientation of the second beam of the first subscription in response to the first subscription changing from the first beam to the second beam.

Example 3. The method of either of examples 1 or 2, further including determining whether a serving cell or serving synchronization signal block (SSB) has changed for the first subscription, in which determining the rotation angle between the orientation of the first beam of the first subscription and the orientation of the second beam of the first subscription includes determining the rotation angle between the orientation of the first beam of the first subscription and the orientation of the second beam of the first subscription in response to determining that the serving cell or serving SSB has not changed for the first subscription.

Example 4. The method of example 3, further including, in response to determining that the serving cell or serving SSB has changed for the first subscription, determining an angular difference between a previous serving cell for the first subscription and a currently serving cell for the first subscription, or between a previous SSB for the first subscription and a current SSB for the first subscription, and adjusting the rotation angle between the orientation of the first beam of the first subscription and the orientation of the second beam using the determined angular difference between the cells or SSBs.

Example 5. The method of any of examples 1-4, in which applying the rotation angle to the first beam of the second subscription to identify the second beam of the second subscription includes applying the rotation angle to a codebook including correlations between spatial coordinates of beams of the first subscription to orientations for beams of the second subscription, and identifying the second beam of the second subscription based in part on a correlation obtained of the determined difference in rotation angle and the second beam of the second subscription.

Example 6. The method of any of examples 1-5, further including performing beam refinement operations for the second beam of the second subscription during the tune-away operation.

Example 7. The method of any of examples 1-6, performing the tune-away operation including tuning a radio frequency (RF) resource of the multi-subscription wireless device to the second subscription and configuring spatial filter parameters of the antenna array to communicate via the identified second beam of the second subscription includes determining whether the second beam of the second subscription is expected to experience interference meeting a threshold interference, and configuring spatial filter parameters of the antenna array to communicate via the identified second beam of the second subscription in response to determining that the second beam of the second subscription is not expected to experience interference meeting a threshold interference.

Example 8. The method of example 7, further including performing measurements of neighbor beams of the second beam of the second subscription in response to determining that the second beam of the second subscription is expected to experience interference meeting a threshold interference, and configuring spatial filter parameters of the antenna array to receive a neighbor beam from among the neighbor beams of the second beam of the second subscription having a relatively highest signal strength.

Example 9. The method of any of examples 1-8, further including initializing a beam sweep timer after beginning the tune-away operation, determining whether the beam sweep timer has elapsed, performing measurements of neighbor beams of the second beam of the second subscription in response to determining that the beam sweep timer has elapsed, and configuring spatial filter parameters of the antenna array to receive a neighbor beam from among the neighbor beams of the second beam of the second subscription having a relatively highest signal strength.

Example 10. The method of any of examples 1-9, further including determining whether a page decode failure has occurred on the second beam of the second subscription, performing measurements of neighbor beams of the second beam of the second subscription in response to determining that the page decode failure has occurred on the second beam of the second subscription, and configuring spatial filter parameters of the antenna array to receive a neighbor beam from among the neighbor beams of the second beam of the second subscription having a relatively highest signal strength.

Example 11. The method of any of examples 1-10, further including determining whether a signal strength of the second beam of the second subscription meets a threshold signal strength, configuring the spatial filter parameters of the antenna array to communicate via the identified second beam of the second subscription in response to determining that the signal strength of the second beam of the second subscription meets the threshold signal strength, and configuring the spatial filter parameters of the antenna array to receive a parent beam of the second beam of the second subscription in response to determining that the signal strength of the second beam of the second subscription does not meet the threshold signal strength.

Example 12. A method performed by a processor of a multi-subscription wireless device for managing beam selection, including receiving simultaneous Transmission Configuration Information (TCI) information that includes a Quasi-Co-Location (QCL) relationship of a first Synchronization Signal Block (SSB) of a first subscription and a second SSB of the first subscription, applying the QCL relationship to a first SSB of a second subscription to determine a second SSB of the second subscription, and performing a tune-away operation including tuning a radio frequency (RF) resource of the multi-subscription wireless device to the second subscription and configuring spatial filter parameters of an antenna array to receive the second SSB of the second subscription.

Example 13. The method of example 12, further including determining whether the second SSB of the first subscription is activated by a TCI state for the second subscription, configuring spatial filter parameters of the antenna array to receive the second SSB of the first subscription for use by the second subscription during the tune-away operation in response to determining that the second SSB of the first subscription is activated by a TCI state for the second subscription, and applying the QCL relationship to the first SSB of the second subscription to determine the second SSB of the second subscription includes applying the QCL relationship to the first SSB of the second subscription to determine the second SSB of the second subscription in response to determining that the second SSB of the first subscription is not activated by a TCI state for the second subscription.

Example 14. The method of either of examples 12 or 13, in which operations of receiving the simultaneous TCI information that includes a QCL relationship of a first SSB of the first subscription and a second SSB of the first subscription, and applying the QCL relationship to a first SSB of the second subscription to determine a second SSB of the second subscription are performed prior to the tune-away operation.

Example 15. The method of any of examples 12-14, in which receiving simultaneous TCI information that includes a QCL relationship of a first SSB of a first subscription and a second SSB of the first subscription includes receiving simultaneous TCI information for a plurality of component carriers that includes a QCL relationship of a first SSB index of a first subscription and a second SSB index of the first subscription, and applying the QCL relationship to a first SSB of a second subscription to determine a second SSB of the second subscription includes applying the QCL relationship to the first SSB of a second subscription to determine the second SSB of the second subscription in response to determining that a current serving component carrier of the second subscription is among the received TCI information for the plurality of component carriers.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a multi-subscription wireless device for managing beam selection, comprising:
   determining a rotation angle between an orientation of a first beam of a first subscription and an orientation of a second beam of the first subscription;
   applying the rotation angle to a first beam of a second subscription to identify a second beam of the second subscription; and
   performing a tune-away operation comprising tuning a radio frequency (RF) resource of the multi-subscription wireless device to the second subscription and configuring spatial filter parameters of an antenna array to communicate via the identified second beam of the second subscription.

2. The method of claim 1, wherein determining the rotation angle between the orientation of the first beam of the first subscription and the orientation of the second beam of the first subscription comprises determining the rotation angle between the orientation of the first beam of the first subscription and the orientation of the second beam of the first subscription in response to the first subscription changing from the first beam to the second beam.

3. The method of claim 1, further comprising determining whether a serving cell or serving synchronization signal block (SSB) has changed for the first subscription,
   wherein determining the rotation angle between the orientation of the first beam of the first subscription and the orientation of the second beam of the first subscription comprises determining the rotation angle between the orientation of the first beam of the first subscription and the orientation of the second beam of the first subscription in response to determining that the serving cell or serving SSB has not changed for the first subscription.

4. The method of claim 3, further comprising, in response to determining that the serving cell or serving SSB has changed for the first subscription:
   determining an angular difference between a previous serving cell for the first subscription and a currently serving cell for the first subscription, or between a previous SSB for the first subscription and a current SSB for the first subscription; and
   adjusting the rotation angle between the orientation of the first beam of the first subscription and the orientation of the second beam using the determined angular difference between the cells or SSBs.

5. The method of claim 1, wherein applying the rotation angle to the first beam of the second subscription to identify the second beam of the second subscription comprises:
   applying the rotation angle to a codebook comprising correlations between spatial coordinates of beams of the first subscription to orientations for beams of the second subscription; and
   identifying the second beam of the second subscription based in part on a correlation obtained of the determined difference in rotation angle and the second beam of the second subscription.

6. The method of claim 1, further comprising performing beam refinement operations for the second beam of the second subscription during the tune-away operation.

7. The method of claim 1, performing the tune-away operation comprising tuning a radio frequency (RF) resource of the multi-subscription wireless device to the second subscription and configuring spatial filter parameters of the antenna array to communicate via the identified second beam of the second subscription comprises:
   determining whether the second beam of the second subscription is expected to experience interference meeting a threshold interference; and
   configuring spatial filter parameters of the antenna array to communicate via the identified second beam of the second subscription in response to determining that the second beam of the second subscription is not expected to experience interference meeting a threshold interference.

8. The method of claim 7, further comprising:
   performing measurements of neighbor beams of the second beam of the second subscription in response to determining that the second beam of the second subscription is expected to experience interference meeting a threshold interference; and
   configuring spatial filter parameters of the antenna array to receive a neighbor beam from among the neighbor beams of the second beam of the second subscription having a relatively highest signal strength.

9. The method of claim 1, further comprising:
   initializing a beam sweep timer after beginning the tune-away operation;
   determining whether the beam sweep timer has elapsed;
   performing measurements of neighbor beams of the second beam of the second subscription in response to determining that the beam sweep timer has elapsed; and
   configuring spatial filter parameters of the antenna array to receive a neighbor beam from among the neighbor beams of the second beam of the second subscription having a relatively highest signal strength.

10. The method of claim 1, further comprising:
    determining whether a page decode failure has occurred on the second beam of the second subscription;
    performing measurements of neighbor beams of the second beam of the second subscription in response to determining that the page decode failure has occurred on the second beam of the second subscription; and
    configuring spatial filter parameters of the antenna array to receive a neighbor beam from among the neighbor beams of the second beam of the second subscription having a relatively highest signal strength.

11. The method of claim 1, further comprising:
    determining whether a signal strength of the second beam of the second subscription meets a threshold signal strength;
    configuring the spatial filter parameters of the antenna array to communicate via the identified second beam of the second subscription in response to determining that the signal strength of the second beam of the second subscription meets the threshold signal strength; and
    configuring the spatial filter parameters of the antenna array to receive a parent beam of the second beam of the second subscription in response to determining that the signal strength of the second beam of the second subscription does not meet the threshold signal strength.

12. A multi-subscription wireless device, comprising:
a processor configured with processor executable instructions to:
determine a rotation angle between an orientation of a first beam of a first subscription and an orientation of a second beam of the first subscription;
apply the rotation angle to a first beam of a second subscription to identify a second beam of the second subscription; and
perform a tune-away operation comprising tuning a radio frequency (RF) resource of the multi-subscription wireless device to the second subscription and configuring spatial filter parameters of an antenna array to communicate via the identified second beam of the second subscription.

13. The multi-subscription wireless device of claim 12, wherein the processor is further configured with processor executable instructions to determine the rotation angle between the orientation of the first beam of the first subscription and the orientation of the second beam of the first subscription in response to the first subscription changing from the first beam to the second beam.

14. The multi-subscription wireless device of claim 12, wherein the processor is further configured with processor executable instructions to:
determine whether a serving cell or serving synchronization signal block (SSB) has changed for the first subscription; and
determine the rotation angle between the orientation of the first beam of the first subscription and the orientation of the second beam of the first subscription in response to determining that the serving cell or serving SSB has not changed for the first subscription.

15. The multi-subscription wireless device of claim 14, wherein the processor is further configured with processor executable instructions to:
determine an angular difference between a previous serving cell for the first subscription and a currently serving cell for the first subscription, or between a previous SSB for the first subscription and a current SSB for the first subscription in response to determining that the serving cell or serving SSB has changed for the first subscription; and
adjust the rotation angle between the orientation of the first beam of the first subscription and the orientation of the second beam using the determined angular difference between the cells or SSBs.

16. The multi-subscription wireless device of claim 12, wherein the processor is further configured with processor executable instructions to:
apply the rotation angle to a codebook comprising correlations between spatial coordinates of beams of the first subscription to orientations for beams of the second subscription; and
identify the second beam of the second subscription based in part on a correlation obtained of the determined difference in rotation angle and the second beam of the second subscription.

17. The multi-subscription wireless device of claim 12, wherein the processor is further configured with processor executable instructions to perform beam refinement operations for the second beam of the second subscription during the tune-away operation.

18. The multi-subscription wireless device of claim 12, wherein the processor is further configured with processor executable instructions to:
determine whether the second beam of the second subscription is expected to experience interference meeting a threshold interference; and
configure spatial filter parameters of the antenna array to communicate via the identified second beam of the second subscription in response to determining that the second beam of the second subscription is not expected to experience interference meeting a threshold interference.

19. The multi-subscription wireless device of claim 18, wherein the processor is further configured with processor executable instructions to:
perform measurements of neighbor beams of the second beam of the second subscription in response to determining that the second beam of the second subscription is expected to experience interference meeting a threshold interference; and
configure spatial filter parameters of the antenna array to receive a neighbor beam from among the neighbor beams of the second beam of the second subscription having a relatively highest signal strength.

20. The multi-subscription wireless device of claim 12, wherein the processor is further configured with processor executable instructions to:
initialize a beam sweep timer after beginning the tune-away operation;
determine whether the beam sweep timer has elapsed;
perform measurements of neighbor beams of the second beam of the second subscription in response to determining that the beam sweep timer has elapsed; and
configure spatial filter parameters of the antenna array to receive a neighbor beam from among the neighbor beams of the second beam of the second subscription having a relatively highest signal strength.

21. The multi-subscription wireless device of claim 12, wherein the processor is further configured with processor executable instructions to:
determine whether a page decode failure has occurred on the second beam of the second subscription;
perform measurements of neighbor beams of the second beam of the second subscription in response to determining that the page decode failure has occurred on the second beam of the second subscription; and
configure spatial filter parameters of the antenna array to receive a neighbor beam from among the neighbor beams of the second beam of the second subscription having a relatively highest signal strength.

22. The multi-subscription wireless device of claim 12, wherein the processor is further configured with processor executable instructions to:
determine whether a signal strength of the second beam of the second subscription meets a threshold signal strength;
configure the spatial filter parameters of the antenna array to communicate via the identified second beam of the second subscription in response to determining that the signal strength of the second beam of the second subscription meets the threshold signal strength; and
configure the spatial filter parameters of the antenna array to receive a parent beam of the second beam of the second subscription in response to determining that the signal strength of the second beam of the second subscription does not meet the threshold signal strength.

23. A method performed by a processor of a multi-subscription wireless device for managing beam selection, comprising:

receiving simultaneous Transmission Configuration Information (TCI) information that includes a Quasi-Co-Location (QCL) relationship of a first Synchronization Signal Block (SSB) of a first subscription and a second SSB of the first subscription;

applying the QCL relationship to a first SSB of a second subscription to determine a second SSB of the second subscription; and performing a tune-away operation comprising tuning a radio frequency (RF) resource of the multi-subscription wireless device to the second subscription and configuring spatial filter parameters of an antenna array to receive the second SSB of the second subscription.

24. The method of claim 23, further comprising:

determining whether the second SSB of the first subscription is activated by a TCI state for the second subscription;

configuring spatial filter parameters of the antenna array to receive the second SSB of the first subscription for use by the second subscription during the tune-away operation in response to determining that the second SSB of the first subscription is activated by a TCI state for the second subscription; and applying the QCL relationship to the first SSB of the second subscription to determine the second SSB of the second subscription comprises applying the QCL relationship to the first SSB of the second subscription to determine the second SSB of the second subscription in response to determining that the second SSB of the first subscription is not activated by a TCI state for the second subscription.

25. The method of claim 23, wherein operations of receiving the simultaneous TCI information that includes a QCL relationship of a first SSB of the first subscription and a second SSB of the first subscription, and applying the QCL relationship to a first SSB of the second subscription to determine a second SSB of the second subscription are performed prior to the tune-away operation.

26. The method of claim 23, wherein:

receiving simultaneous TCI information that includes a QCL relationship of a first SSB of a first subscription and a second SSB of the first subscription comprises receiving simultaneous TCI information for a plurality of component carriers that includes a QCL relationship of a first SSB index of the first subscription and a second SSB index of the first subscription; and applying the QCL relationship to a first SSB of a second subscription to determine a second SSB of the second subscription comprises applying the QCL relationship to the first SSB of a second subscription to determine the second SSB of the second subscription in response to determining that a current serving component carrier of the second subscription is among the received TCI information for the plurality of component carriers.

27. A multi-subscription wireless device, comprising:

a processor configured with processor executable instructions to:

receive simultaneous Transmission Configuration Information (TCI) information that includes a Quasi-Co-Location (QCL) relationship of a first Synchronization Signal Block (SSB) of a first subscription and a second SSB of the first subscription;

apply the QCL relationship to a first SSB of a second subscription to determine a second SSB of the second subscription; and perform a tune-away operation comprising tuning a radio frequency (RF) resource of the multi-subscription wireless device to the second subscription and configuring spatial filter parameters of an antenna array to receive the second SSB of the second subscription.

28. The multi-subscription wireless device of claim 27, wherein the processor is further configured with processor executable instructions to:

determine whether the second SSB of the first subscription is activated by a TCI state for the second subscription;

configure spatial filter parameters of the antenna array to receive the second SSB of the first subscription for use by the second subscription during the tune-away operation in response to determining that the second SSB of the first subscription is activated by a TCI state for the second subscription; and apply the QCL relationship to the first SSB of the second subscription to determine the second SSB of the second subscription comprises applying the QCL relationship to the first SSB of the second subscription to determine the second SSB of the second subscription in response to determining that the second SSB of the first subscription is not activated by a TCI state for the second subscription.

29. The multi-subscription wireless device of claim 27, wherein the processor is further configured with processor executable instructions to receive the simultaneous TCI information that includes a QCL relationship of a first SSB of the first subscription and a second SSB of the first subscription, and apply the QCL relationship to a first SSB of the second subscription to determine a second SSB of the second subscription prior to the tune-away operation.

30. The multi-subscription wireless device of claim 27, wherein the processor is further configured with processor executable instructions to:

receive simultaneous TCI information for a plurality of component carriers that includes a QCL relationship of a first SSB index of the first subscription and a second SSB index of the first subscription; and apply the QCL relationship to the first SSB of a second subscription to determine the second SSB of the second subscription in response to determining that a current serving component carrier of the second subscription is among the received TCI information for the plurality of component carriers.

* * * * *